(12) United States Patent
Gould et al.

(10) Patent No.: US 10,112,248 B2
(45) Date of Patent: Oct. 30, 2018

(54) METHOD OF CREATING A BONDED STRUCTURE AND APPARATUSES FOR SAME

(71) Applicant: CELLTECH METALS INC., San Diego, CA (US)

(72) Inventors: Jerry E. Gould, Grandview Heights, OH (US); William J. Kapper, Dalton, OH (US)

(73) Assignee: CellTech Metals, Inc., Oceanside, CA (US)

(*) Notice: Subject to any disclaimer, the term of this patent is extended or adjusted under 35 U.S.C. 154(b) by 8 days.

(21) Appl. No.: 15/508,967

(22) PCT Filed: Sep. 8, 2015

(86) PCT No.: PCT/US2015/049010
§ 371 (c)(1),
(2) Date: Mar. 6, 2017

(87) PCT Pub. No.: WO2016/040365
PCT Pub. Date: Mar. 17, 2016

(65) Prior Publication Data
US 2017/0274465 A1    Sep. 28, 2017

Related U.S. Application Data

(60) Provisional application No. 62/047,928, filed on Sep. 9, 2014.

(51) Int. Cl.
*B23K 20/00*  (2006.01)
*B23K 1/19*  (2006.01)
(Continued)

(52) U.S. Cl.
CPC ............... *B23K 1/19* (2013.01); *B23K 1/002* (2013.01); *B23K 1/0014* (2013.01);
(Continued)

(58) Field of Classification Search
CPC ........ B23K 1/19; B23K 3/085; B23K 3/0475; B23K 1/0014; B23K 1/002;
(Continued)

(56) References Cited

U.S. PATENT DOCUMENTS

| | | |
|---|---|---|
| 2,087,010 A | 7/1937 | Wardle |
| 2,391,997 A | 1/1946 | Noble |

(Continued)

FOREIGN PATENT DOCUMENTS

| | | | |
|---|---|---|---|
| JP | 56158271 A | * | 12/1981 |
| JP | 56158272 A | * | 12/1981 |

OTHER PUBLICATIONS

Brazetec, "The Principles of Brazing for Pipe Installation," www.brazetec.com, pp. 1-27 (2001).

(Continued)

*Primary Examiner* — Kiley S Stoner
(74) *Attorney, Agent, or Firm* — Harness, Dickey & Pierce, P.L.C.

(57) ABSTRACT

A method for creating a bonded zinc-coated structure is provided. In another aspect, a sheet metal joining system includes a heated roller contacting a sheet metal workpiece to braze together zinc-based coatings. A further aspect employs a zinc coated metal sandwich including a core having peaks and valleys.

49 Claims, 23 Drawing Sheets

(51) Int. Cl.
| | |
|---|---|
| *B23K 20/04* | (2006.01) |
| *B23K 1/002* | (2006.01) |
| *B23K 1/00* | (2006.01) |
| *B23K 3/047* | (2006.01) |
| *B23K 3/08* | (2006.01) |
| *C22C 18/04* | (2006.01) |
| *C22C 21/10* | (2006.01) |
| *B23K 101/34* | (2006.01) |
| *B23K 103/16* | (2006.01) |

(52) U.S. Cl.
CPC ............ *B23K 3/0475* (2013.01); *B23K 3/085* (2013.01); *B23K 20/04* (2013.01); *C22C 18/04* (2013.01); *C22C 21/10* (2013.01); *B23K 2101/34* (2018.08); *B23K 2101/35* (2018.08); *B23K 2103/166* (2018.08)

(58) Field of Classification Search
CPC .......... B23K 2101/35; B23K 2103/166; B23K 2101/34; B23K 1/0012; B23K 20/04; B23K 2101/02; B23K 2101/14; C22C 21/10; C22C 18/04
USPC ........... 228/17, 181, 183, 46, 200, 158, 117, 228/235.2, 235.3
See application file for complete search history.

(56) References Cited

U.S. PATENT DOCUMENTS

| | | | |
|---|---|---|---|
| 2,441,476 A | 5/1948 | Ewald | |
| 2,481,046 A | 9/1949 | Scurlock | |
| 2,691,208 A * | 10/1954 | Brennan | B23K 20/04 228/222 |
| 2,738,297 A | 3/1956 | Pfisterhammer | |
| 2,809,908 A | 10/1957 | French | |
| 2,950,788 A | 8/1960 | Edgar | |
| 3,013,641 A | 12/1961 | Compton | |
| 3,071,853 A | 1/1963 | Price et al. | |
| 3,086,899 A | 4/1963 | Smith | |
| 3,151,712 A | 10/1964 | Jackson | |
| 3,173,383 A | 3/1965 | Eggert | |
| 3,217,845 A | 11/1965 | Koeller | |
| 3,227,598 A | 1/1966 | Robb | |
| 3,269,004 A * | 8/1966 | Smith, Jr. | B23K 20/2275 228/190 |
| 3,432,859 A | 3/1969 | Jordan | |
| 3,481,642 A | 12/1969 | Campbell | |
| 3,525,663 A | 8/1970 | Hale | |
| 3,597,891 A | 8/1971 | Martin | |
| 3,742,663 A | 7/1973 | Duskin | |
| 3,811,177 A | 5/1974 | Schoer et al. | |
| 3,834,487 A | 9/1974 | Hale | |
| 3,865,679 A | 2/1975 | Hale | |
| 3,876,492 A | 4/1975 | Schott | |
| 3,906,618 A * | 9/1975 | Sendzimir | B21B 13/20 219/646 |
| 3,914,486 A | 10/1975 | Borgford | |
| 3,938,963 A | 2/1976 | Hale | |
| 3,950,259 A | 4/1976 | Pallo et al. | |
| 4,025,996 A | 5/1977 | Saveker | |
| 4,044,186 A | 8/1977 | Stangeland | |
| 4,049,855 A | 9/1977 | Cogan | |
| 4,077,247 A | 3/1978 | Stewart | |
| 4,213,558 A * | 7/1980 | Hirobe | B23K 20/04 164/417 |
| 4,275,663 A | 6/1981 | Sivachenko et al. | |
| 4,306,674 A * | 12/1981 | Charles | B23K 3/085 228/36 |
| 4,356,678 A | 11/1982 | Andrews et al. | |
| 4,411,121 A | 10/1983 | Blacklin et al. | |
| 4,572,939 A | 2/1986 | Harast | |
| 4,622,445 A | 11/1986 | Matsen | |
| 4,706,871 A * | 11/1987 | Kajiwara | B23K 13/00 228/158 |
| 4,718,214 A | 1/1988 | Waggoner | |
| 5,024,795 A | 6/1991 | Kennedy et al. | |
| 5,030,488 A | 7/1991 | Sobolev | |
| 5,089,682 A * | 2/1992 | Davies | B23K 11/063 219/64 |
| 5,366,787 A | 11/1994 | Yasui et al. | |
| 5,504,296 A | 4/1996 | Sato et al. | |
| 5,666,627 A | 9/1997 | Yamaguchi | |
| 6,183,879 B1 | 2/2001 | Deeley | |
| 6,547,280 B1 | 4/2003 | Ashmead | |
| 6,846,559 B2 | 1/2005 | Czaplicki et al. | |
| 6,908,143 B2 | 6/2005 | Ashmead | |
| 6,939,599 B2 | 9/2005 | Clark | |
| 7,010,897 B1 | 3/2006 | Kuppers | |
| 7,025,408 B2 | 4/2006 | Jones et al. | |
| 7,267,393 B2 | 9/2007 | Booher | |
| 7,401,844 B2 | 7/2008 | Lemmons | |
| 7,648,058 B2 | 1/2010 | Straza | |
| 7,752,729 B2 | 7/2010 | Faehrrolfes et al. | |
| 7,753,254 B2 | 7/2010 | Straza | |
| 7,757,931 B2 | 7/2010 | Straza | |
| 7,927,708 B2 | 4/2011 | Mizrahi | |
| 8,205,642 B2 | 6/2012 | Straza | |
| 8,434,472 B2 | 5/2013 | Hanson et al. | |
| 8,448,839 B1 | 5/2013 | Rakozy et al. | |
| 8,568,826 B2 | 10/2013 | Park et al. | |
| 8,580,061 B2 | 11/2013 | Cik | |
| 8,835,016 B2 | 9/2014 | Ebnoether | |
| 2002/0195477 A1* | 12/2002 | Kazama | B21B 28/04 228/17 |
| 2004/0056071 A1 | 3/2004 | Pohlman | |
| 2005/0029708 A1 | 2/2005 | Coyle | |
| 2005/0084703 A1 | 4/2005 | Ashmead | |
| 2005/0167885 A1 | 8/2005 | Hennessey et al. | |
| 2011/0073102 A1 | 3/2011 | Hanson et al. | |
| 2012/0234470 A1 | 9/2012 | Nishio et al. | |
| 2013/0224419 A1 | 8/2013 | Lee et al. | |
| 2013/0244006 A1 | 9/2013 | Ebnoether | |
| 2015/0020930 A1* | 1/2015 | Kamat | C22C 21/00 148/551 |
| 2015/0044494 A1 | 2/2015 | Ebnoether | |
| 2015/0165724 A1 | 6/2015 | Cox et al. | |
| 2017/0036415 A1 | 2/2017 | Ebnother et al. | |
| 2017/0129180 A1* | 5/2017 | Coates | B33Y 30/00 |
| 2017/0274465 A1 | 9/2017 | Gould et al. | |
| 2017/0327310 A1 | 11/2017 | Ebnother et al. | |

OTHER PUBLICATIONS

"Brazing of Non-Ferrous Metals," www.key-to-metals.com/Article36.htm, visited Oct. 18, 2005.
DOI, The Japan Automotive Digest (2007) p. 7.
Encyclopedia of brazing and soldering—C—www.brazetec.com/brazetec/content_en/lexicon/c.cfm, visited Oct. 18, 2005.
Feldbauer, "Modern Brazing of Stainless Steel," Welding Journal, www.aws.org/wj/2004/10/030. visited Oct. 18, 2005.
International Search Report and Written Opinion for PCT/US06/45102, dated May 22, 2007, 5 pages.
Mohandas et al., Journal of Materials Science Letters (1999) 18:167.
Mohr and Straza, Advanced Engineering Material (2005) 7(4):243-246.
"Metals Handbook," American Society for Metals, Welding and Brazing, 8th Edition, vol. 6, 1971, 54 pages.
"The Brazing Guide," Turnkey Heating Solutions, GH Induction Atmospheres Group, published Jun. 2010, pp. 1-10.
Wilden, J., et al., "Low temperature brazing of zinc coated steel and steel/aluminum joints by setting ZnAl-Alloys as brazing material," Proceedings of the 3rd International Brazing and Soldering Conference, Apr. 24-26, 2006, pp. 32-39.
Gould, J., "Influence of System Factors on Energy Consumption During Resistance Welding," EWI, Feb. 21, 2013, 44 pages.

* cited by examiner

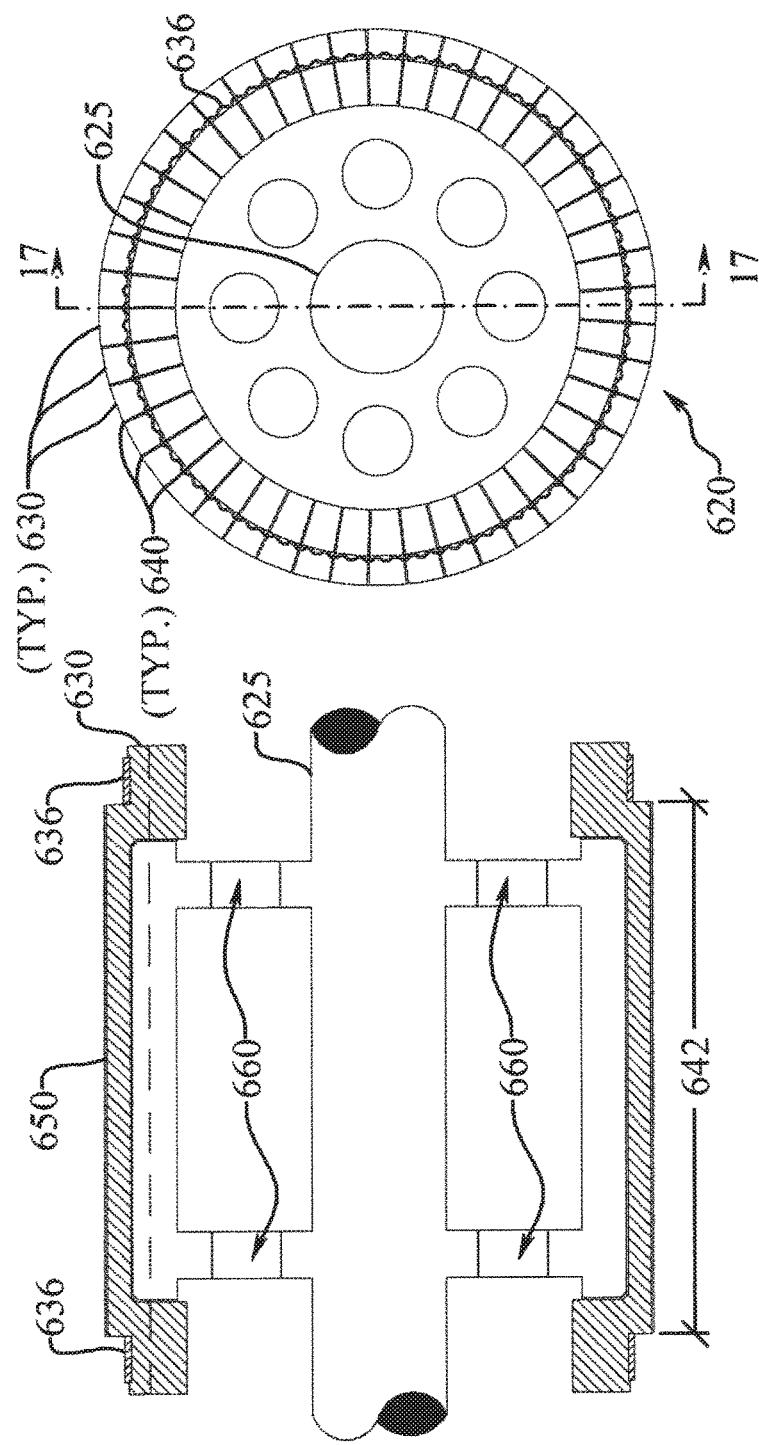

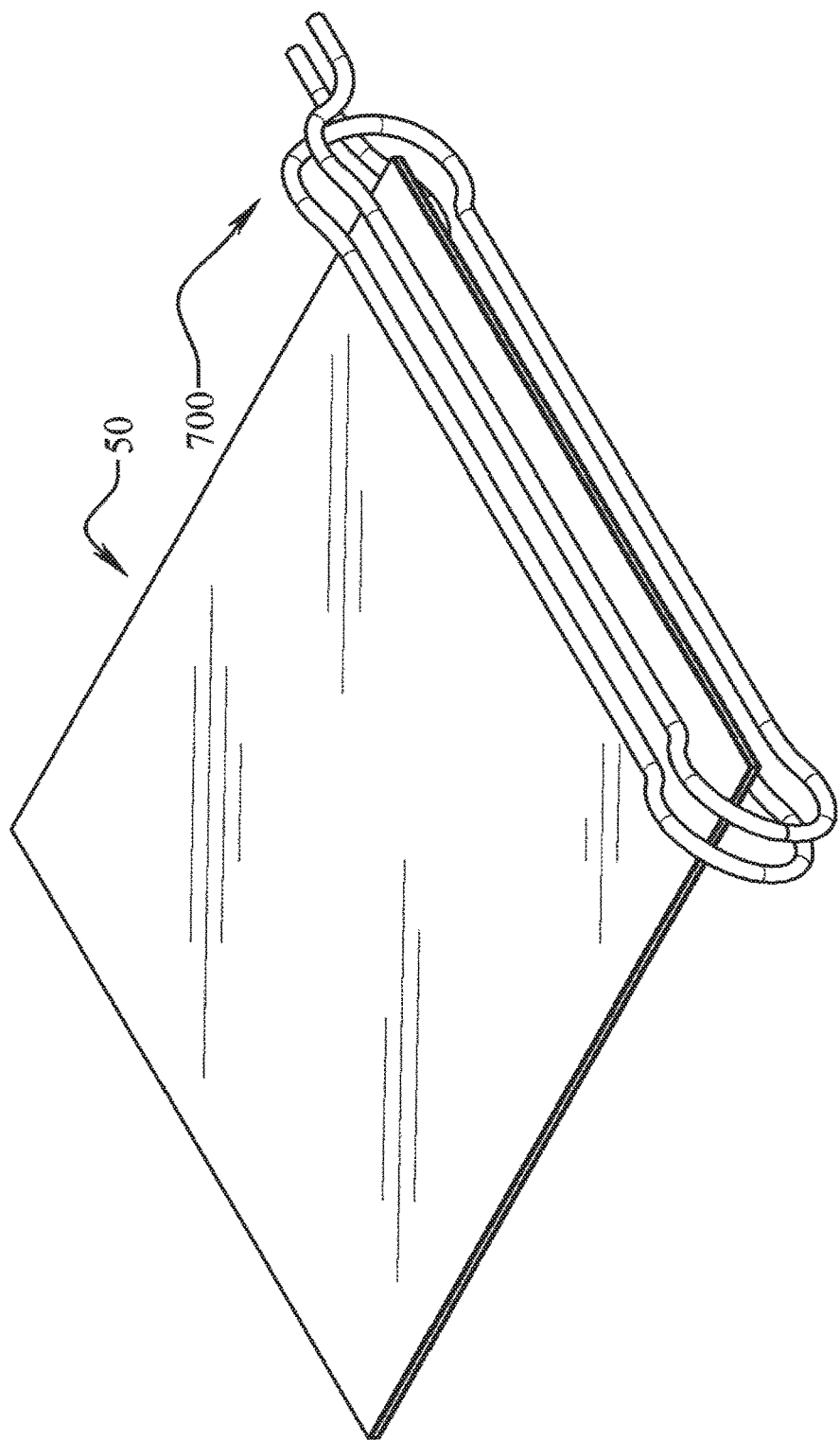

METHOD OF CREATING A BONDED STRUCTURE AND APPARATUSES FOR SAME

CROSS-REFERENCE TO RELATED APPLICATIONS

This application is a National Phase Entry of International Patent Application No. PCT/US2015/049010, filed on Sep. 8, 2015, which claims the benefit of U.S. Provisional Application Ser. No. 62/047,928, filed on Sep. 9, 2014, both of which are incorporated by reference herein.

BACKGROUND

The present disclosure relates generally to bonded structures and more particularly to brazed metallic workpieces.

It is known to make a sandwich of metal sheets, the center core sheet including peaks and valleys. Such sheets are bonded together with adhesive in production. Examples of such a sandwich are disclosed in commonly owned U.S. Pat. No. 8,835,016 entitled "Optimal Sandwich Core Structures and Forming Tools for the Mass Production of Sandwich Structures" which issued to Ebnoether on Sep. 16, 2014, and U.S. Pat. No. 7,648,058 entitled "Formed Metal Core Sandwich Structure and Method and System for Making Same" which issued to Straza on Jan. 19, 2010, both of which are incorporated by reference herein. These patents have been significant improvements in the industry. Furthermore, these patents mention brazing as a method to bond together the sandwich sheets. There is room for additional improvement, however, in developing brazing machines and methods which are cost effective and efficient in high volume manufacturing of large production parts.

It is also known to braze zinc coated steel sheets. For example, laser soldering and arc welding approaches are discussed in Wilden et al., "Low Temperature Brazing of Zinc Coated Steel and Steel/Aluminum Joints by Setting ZnAl-Alloys as Brazing Material," Proceedings of the $3^{rd}$ International Brazing and Soldering Conference (Apr. 24-26, 2006). Nevertheless, such procedures and equipment are not well suited for cost effective and high volume production manufacturing, especially involving large workpiece sheets.

SUMMARY

In accordance with the present invention, a method for creating a bonded zinc-coated structure is provided. In another aspect, a sheet metal joining system includes a heated roller contacting a sheet metal workpiece to indirectly braze together zinc-based coatings. A further aspect employs a zinc coated metal sandwich including a core having peaks and valleys.

The present method and system are advantageous over conventional devices. For example, the present method and system do not desire the use of a separate brazing alloy or flux, thereby saving cost and simplifying the process. It is also envisioned that the present system and method are more cost effective and efficient at brazing large workpiece sheets together in a high volume production manufacturing plant. Additional advantages and features of the present method and system will become apparent from the following description and appended drawings.

BRIEF DESCRIPTION OF THE DRAWINGS

Without limiting the scope of the present invention as claimed below and referring now to the drawings and figures:

FIG. 16 shows a schematic and elevational view of an embodiment of a resistive heat generation roller;

FIG. 17 shows a schematic cross-sectional view of an embodiment of a resistive heat generation roller;

FIG. 18 shows a schematic perspective view of an embodiment of an induction hearing source;

Figure 1:
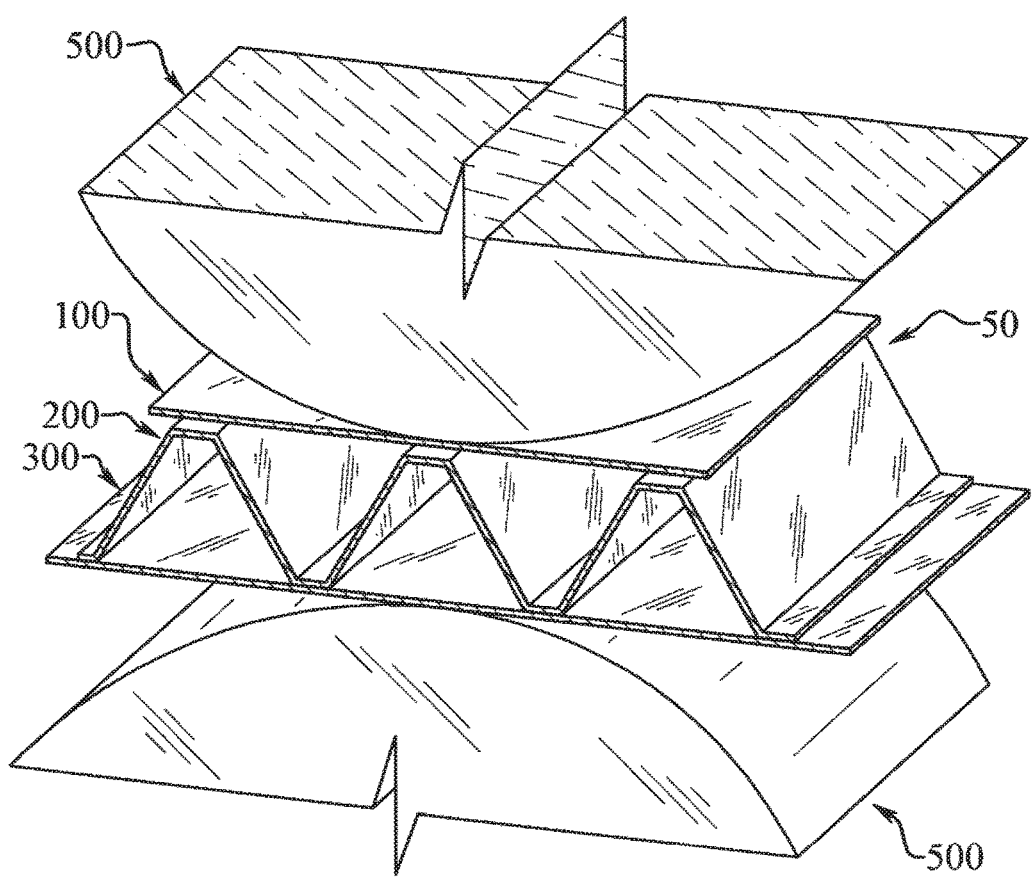
FIG. 1 shows a schematic perspective view of two heating sources in contact with three workpieces.

These drawings are provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION

The present disclosure includes a method for creating a bonded structure, an apparatus for creating a bonded structure, and a method for creating a zinc-coated bonded structure. The disclosure enables a significant advance in the state of the art. The preferred embodiments of the methods and apparatus accomplish this by new and novel methods that are configured in unique and novel ways and which demonstrate previously unavailable but preferred and desirable capabilities. The description set forth below in connection with the drawings is intended merely as a description of the presently preferred embodiments, and is not intended to represent the only form in which the present invention may be constructed or utilized. The description sets forth the designs, functions, means, and methods of implementing the disclosed embodiments. It is to be understood, however, that the same or equivalent functions and features may be accomplished by different embodiments that are also intended to be encompassed within the spirit and scope of the disclosure.

Figure 2:
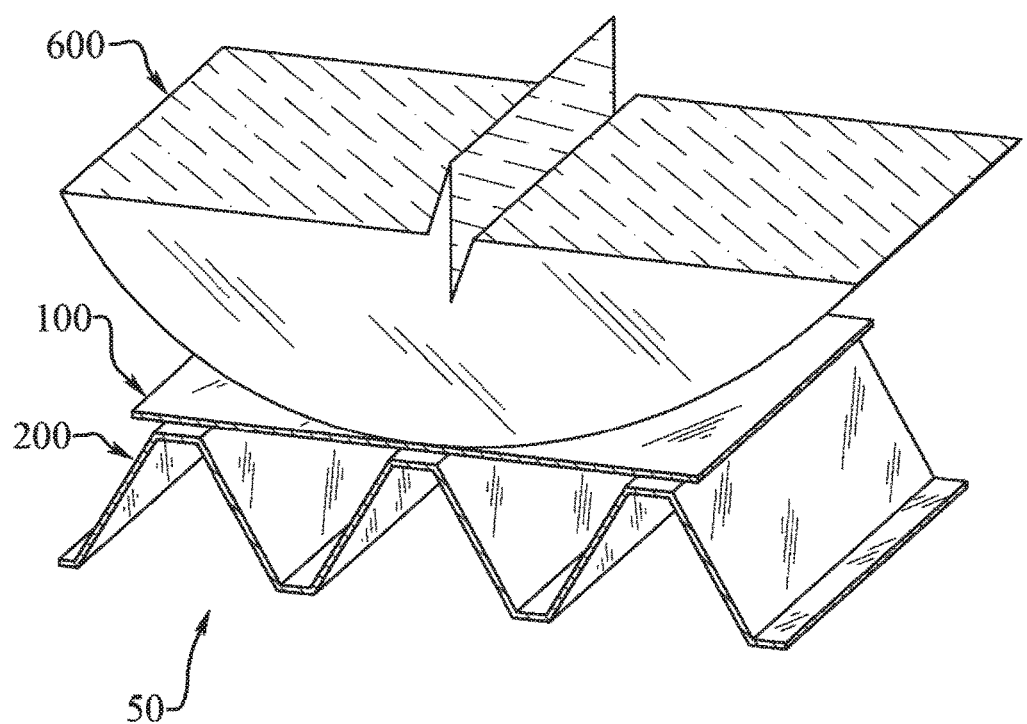
FIG. 2 shows a schematic perspective view of a conductive heating source in contact with two workpieces.
Figure 10:
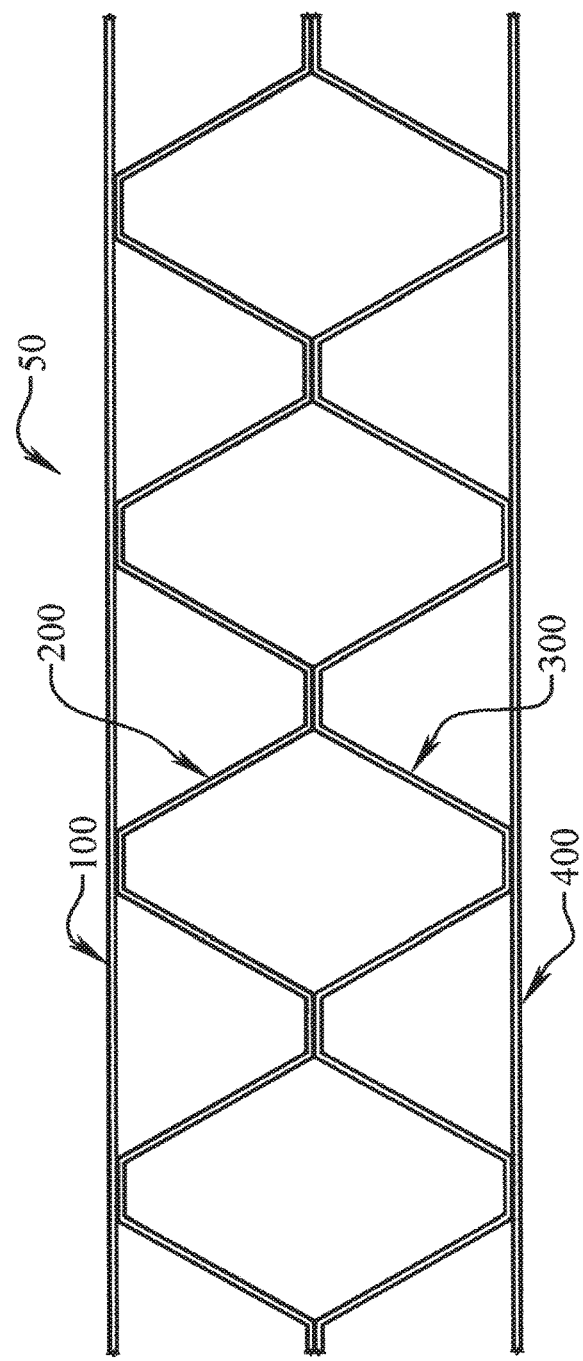
FIG. 10 shows a schematic side elevational view of four workpieces ready to be joined together.

The methods and apparatus disclosed and claimed herein are related to the joining of workpieces, therefore the workpieces will first be disclosed in detail. In general, the methods disclosed produce a bonded structure 50. The bonded structure 50 is composed of at least two workpieces, namely a first workpiece 100 and a second workpiece 200, as seen in FIG. 2. However, one skilled in the art will appreciate that the principles and methods disclosed are equally applicable to three workpiece structures, as seen in FIG. 1, which include a first workpiece 100, a second workpiece 200, and a third workpiece 300, as well as structures containing four or more workpiece structures, as seen in FIG. 10 in which a fourth workpiece 400 is illustrated. Further, while the disclosure and figures herein generally illustrate workpieces in sheet form, the workpieces may encompass any form that contains a coating as disclosed herein to facilitate the disclosed bonding methods although certain advantages may not be realized. Further, the coating need not be permanently attached to either of the workpieces prior to joining process.

Figure 3:
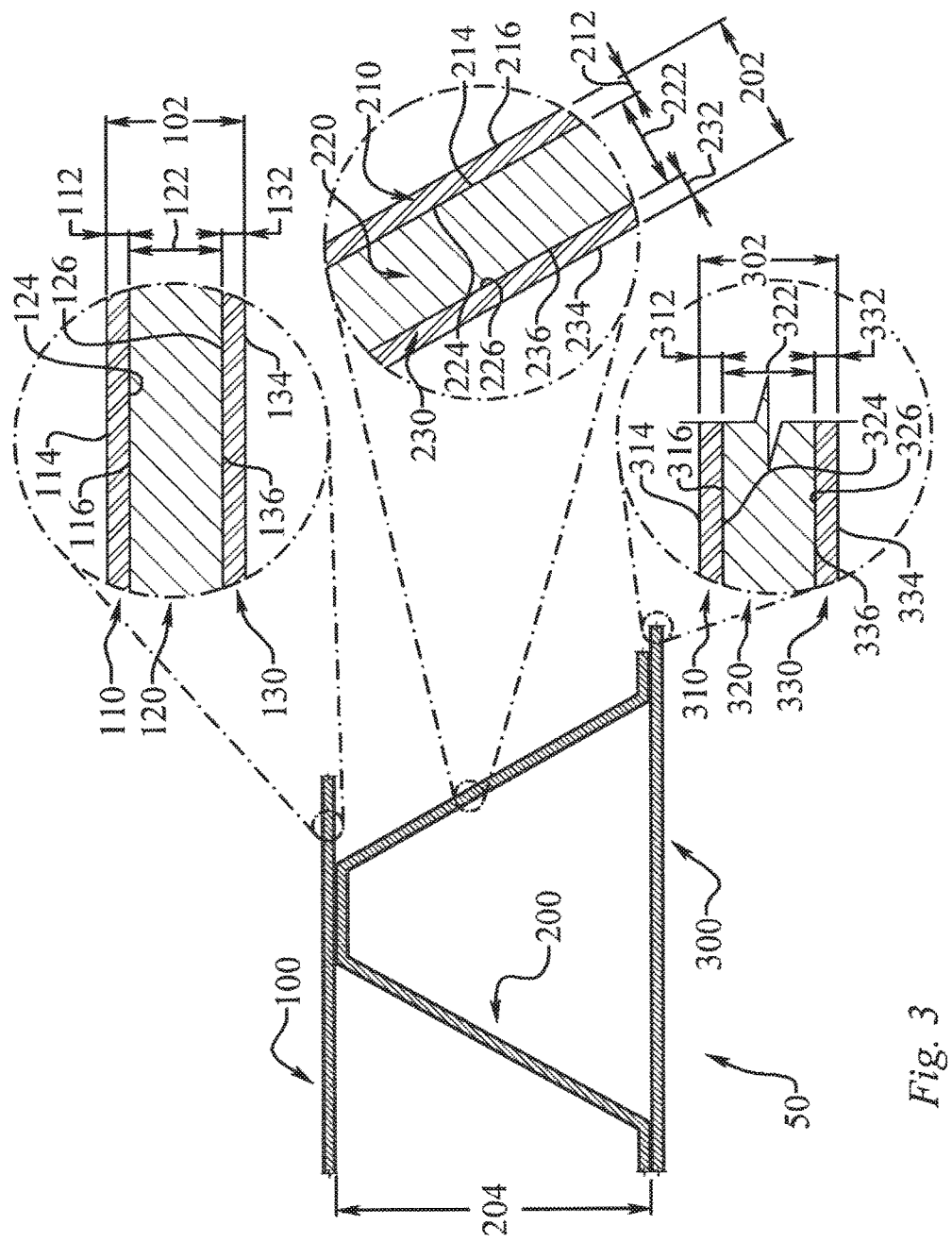
FIG. 3 shows a schematic side elevational view of three workpieces ready to be joined together.

Now, for the purpose of putting the balance of the disclosure in perspective, various elements of the workpieces will be discussed. While the following disclosure will describe the workpieces as each having at least three components, namely two coating layers and a parent material layer, these three components are not necessary to carry out the claimed methods, rather it is only necessary that one of the workpieces include at least one coating layer. The structure 50 illustrated in FIG. 3 shows a three workpiece embodiment having a first workpiece 100, a second workpiece 200, and a third workpiece 300. In the illustrated embodiment the first workpiece 100 includes a first workpiece parent material layer 120 bounded by a first workpiece proximal coating layer 110 on one side and a first workpiece distal coating layer 130 on the opposite side. In this embodiment the first workpiece parent material layer 120 has a first workpiece parent material layer thickness 122, the first workpiece proximal coating layer 110 has a first workpiece proximal coating layer thickness 112, and the first workpiece distal coating layer 130 has a first workpiece distal coating layer thickness 132; thereby combining to have a first workpiece overall thickness 102. Likewise, in the illustrated embodiment, the second workpiece 200 includes a second workpiece parent material layer 220 bounded by a second workpiece proximal coating layer 210 and a second workpiece distal coating layer 230. Similarly, the second workpiece parent material layer 220 has a second workpiece parent material layer thickness 222, the second workpiece proximal coating layer 210 has a second workpiece proximal coating layer thickness 212, and the second workpiece distal coating layer 230 has a second workpiece distal coating layer thickness 232; thereby combining to have a second workpiece overall thickness 202. Further, carrying this forward to the third workpiece 300, the illustrated embodiment has a third workpiece parent material layer 320 bounded by a third workpiece proximal coating layer 310 and a third workpiece coating layer 330. As expected, the third workpiece parent material layer 320 has a third workpiece parent material layer thickness 322, the third workpiece proximal coating layer 310 has a third workpiece proximal coating layer thickness 312, and the third workpiece distal coating layer 330 has a third workpiece distal coating layer thickness 332; thereby combining to have a third workpiece overall thickness 302. One with skill in the art will recognize the structure of the element nomenclature outlined above and will be capable of carrying if forward to embodiments containing even more workpieces, such as the four workpiece embodiment of FIG. 10.

As previously mentioned, the claimed methods do not require the workpieces to each include all three of the layers just described. In fact, one particular embodiment merely requires a first workpiece 100 having a first workpiece parent material layer 120 and a first workpiece distal coating layer 130, and a second workpiece 200 having a second workpiece parent material layer 220. The present methods create a bonded structure 50 by melting and resolidifying a portion of the first workpiece distal coating layer 130 to bond the first workpiece 100 and the second workpiece 200 together without melting, or passing electrical current through, either the first workpiece parent material layer 120 or the second workpiece parent material layer 220. Thus, the melting point of the first workpiece distal coating layer 130 is below the melting point of the first workpiece parent material layer 120 or the second workpiece parent material layer 220. Even in this embodiment, however, the first workpiece distal coating layer thickness 132 is less than four percent of the first workpiece parent material layer thickness 122. Further embodiments incorporate even thinner coating thickness such as a first workpiece distal coating layer thickness 132 of less than one percent of the first workpiece parent material layer thickness 122. Another embodiment includes a metallic sandwich of three or more sheet layers (such as greater than 1 m$^2$ and more preferably greater than 1 m wide by 2 m long), the center layer of which is a core having alternating peaks and valleys embossed therein, with raised ridges spanning between the peaks in one direction but not in a direction perpendicular thereto.

With the description of the various workpieces complete, the embodiments of the methods used to create the bonded structure 50 will now be disclosed in detail with general reference to FIG. 2. In this embodiment the method of creating the bonded structure 50 includes at least three steps; namely the steps of (i) positioning the first workpiece 100 and the second workpiece 200 in at least partial contact, (ii) heating a portion of the first workpiece distal coating layer 130 with a heating source 500 from an initial temperature to a processing temperature within a heating time period to form a substantially liquid zone between a portion of the first workpiece 100 and a portion of the second workpiece 100, wherein the substantially liquid zone contains a portion of the first workpiece distal coating layer 130, and (iii) cooling the substantially liquid zone with a cooling system 800 to solidification in a cooling time period to create a bonded connection 900, illustrated nicely in FIG. 6, thereby joining the first workpiece 100 to the second workpiece 200 to create the joined stricture 50. The "a portion" language is used because the claimed methods are not limited to complete bonding of two perfectly mating workpieces, such as flat sheets. In fact, the claimed methods are particularly effective in joining workpieces that do not have similar shapes, such as the example illustrated throughout of a corrugated sheet being joined to a flat sheet. Additionally, while the figures generally show a structure including a uniformly corrugated sheet, any of the workpieces may include non-uniformly spaced corrugations, cells, protuberances, projections, or mating surfaces. In such embodiments, the workpiece that is formed into a shape other than a flat sheet ends up having an overall formed thickness; thus, the second workpiece 200 illustrated in FIG. 3 has a second workpiece formed thickness 204. The three steps will now be briefly discussed in order prior to a detailed discussion of each.

The "positioning" step mentioned above merely requires that positioning the first workpiece 100 and the second workpiece 200 in at least partial contact so that at least a portion of the first workpiece distal coating layer 130 can be quickly melted and resolidified thereby bonding the two workpieces together. Depending on the type of workpieces, the "positioning" step may be as simple as laying one workpiece on top of the other. Alternatively, simple clamps or guide brackets may be used to position the workpieces for the "heating" step. Further, complex workpieces may be tack welded together to ensure proper initial positioning. Obviously complexly shaped workpieces may require fixtures to maintain the workpieces in the proper position.

The "heating" and "cooling" steps may be accomplished by any number of ways; however, one attribute common to the methods disclosed herein is the speed at which they occur. In fact, the combination of the heating time period and the cooling time period is less than 10 seconds. This short time frame from the start of heating, through melting of the first workpiece distal coating layer 130, and solidification of the bonded connection 900 allows the present method to join workpieces at a high speed using at least one coating layer that has not previously been used. Further embodiments greatly reduce the combined heating time period and cooling time period, as will be discussed in more detail later.

Figure 6:
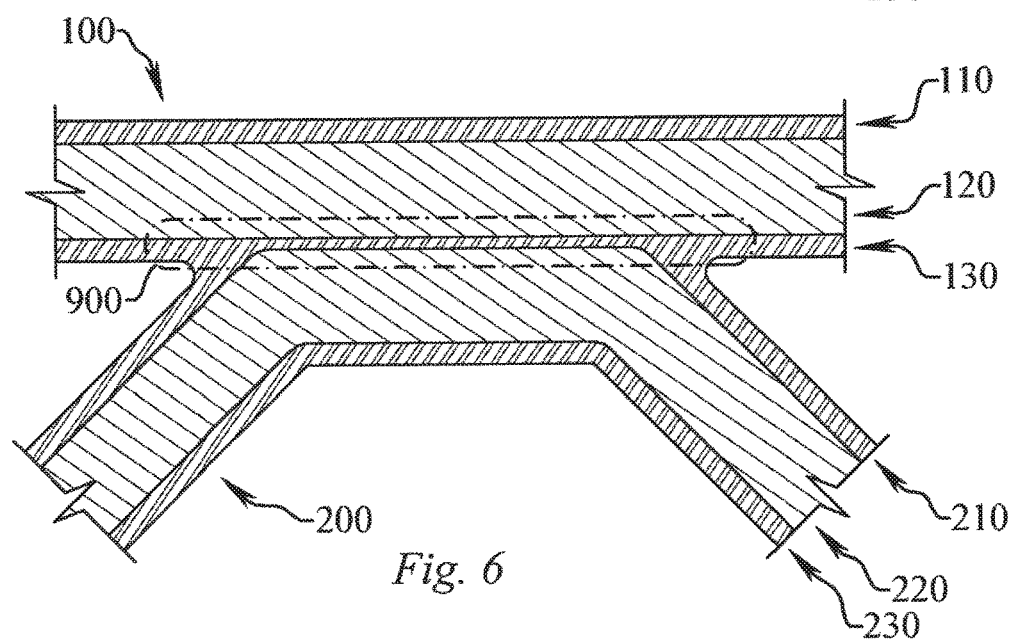
FIG. 6 shows a schematic cross-sectional view of two workpieces after joining.

In fact, in one embodiment the speed of the present methods facilitates the use of a zinc-based distal coating layer 130. The reference to "zinc-based" herein refers to coatings containing at least forty percent zinc. In the past, soldering and brazing alloys have avoided containing significant quantities of zinc for many reasons. Zinc is known to quickly volatilize, which negatively affects the bonded joint, and such volatilization produces zinc vapors that may be harmful to workers. Further, slow processes attempting to avoid such volatilization generally result in the formation of intermetallics that negatively affect the bonded connection 900. An embodiment of the claimed method reflows the zinc-based distal coating layer 130 while significantly reducing, if not eliminating, volatilization and produces a bonded connection that maintains the corrosion resistance afforded by the original zinc-based distal coating layer 130, as seen in FIG. 6 in which the reflow of the distal coating layer 130 creates a continuous coating around the bonded connection 900.

The present embodiment offers increased production efficiency by facilitating the use of zinc-based joining materials. After all, many materials are commonly available with zinc-based coatings for corrosion resistance. For instance, the hot-dip coating family alone includes the following commonly available zinc-based coatings having substantial amounts of zinc: galvanize, galvaneel, 55% aluminum-zinc alloy, zinc-5% aluminum alloy, and zinc-aluminum-magnesium alloy. In this embodiment, the present method facilitates the use of such common material coatings to join numerous workpieces, without the need to add separate soldering or brazing alloys, and in one embodiment, without the need for any flux or a vacuum environment. Additional coating layers and parent material layers will be discussed in detail later.

Figure 9:
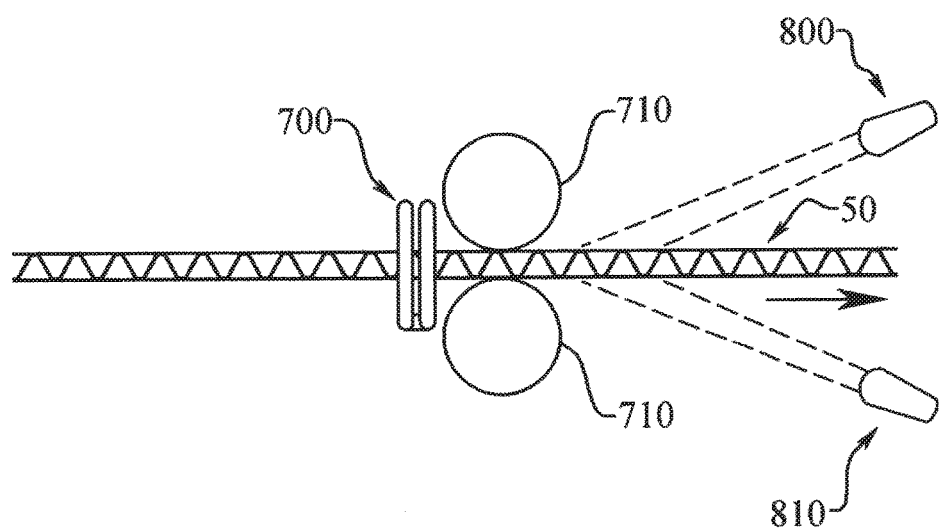
FIG. 9 shows a schematic side elevational view of two induction heating sources creating a bonded structure.

The claimed methods may utilize any heating source 500 and cooling source 800 capable of satisfying the requirement that the combination of the heating time period and the cooling time period is less than 10 seconds, while not transmitting electrical current through the workpieces. Such heating sources 500 include, but are not limited to, a conduction heating source 600 or an induction heating source 700, as seen in FIGS. 1 and 9 respectively. The conduction heating source 600 will be now described in detail.

Figure 4:
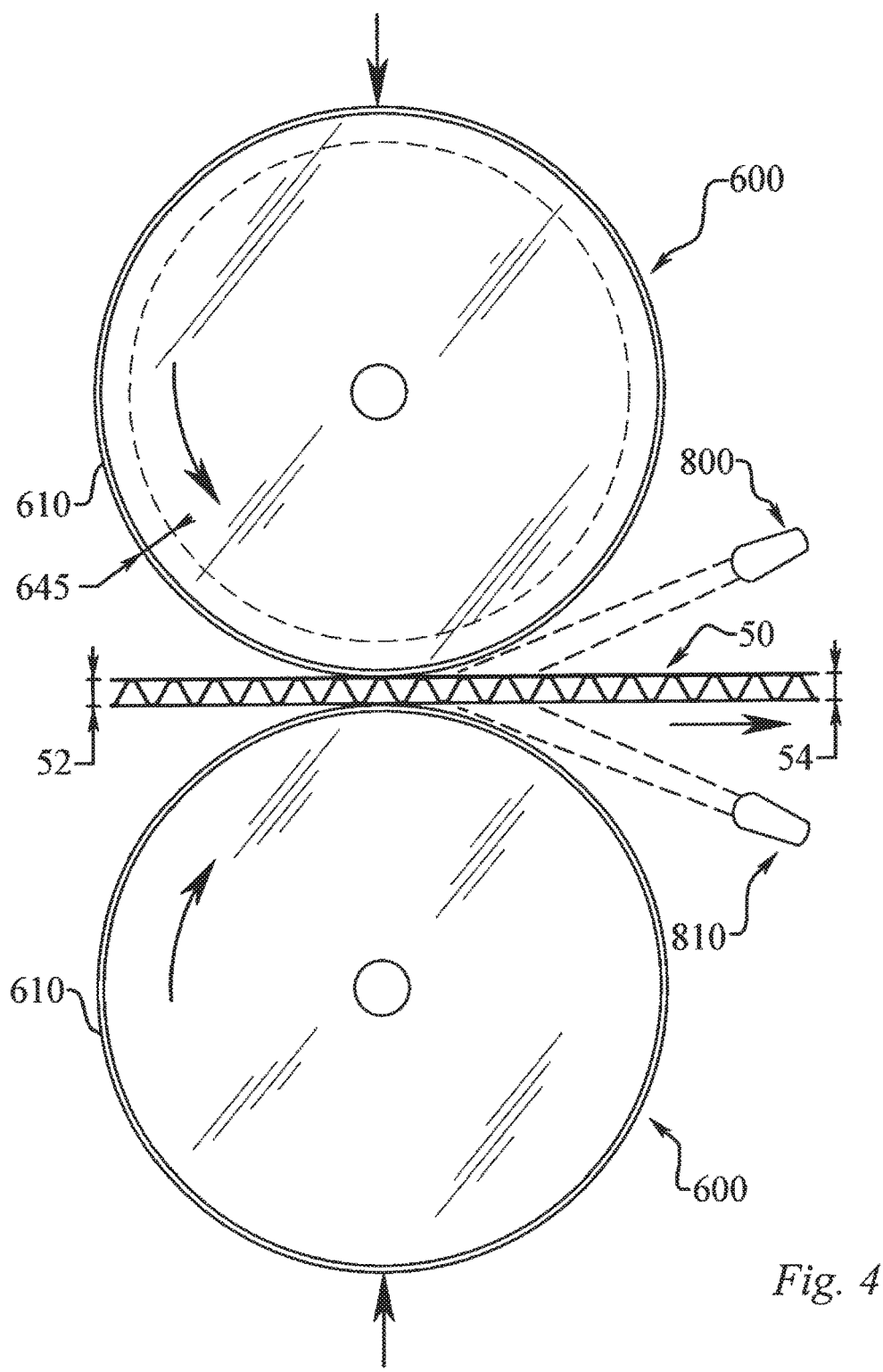
FIG. 4 shows a schematic side elevational view of two resistive heat generation devices creating a bonded structure.
Figure 5:
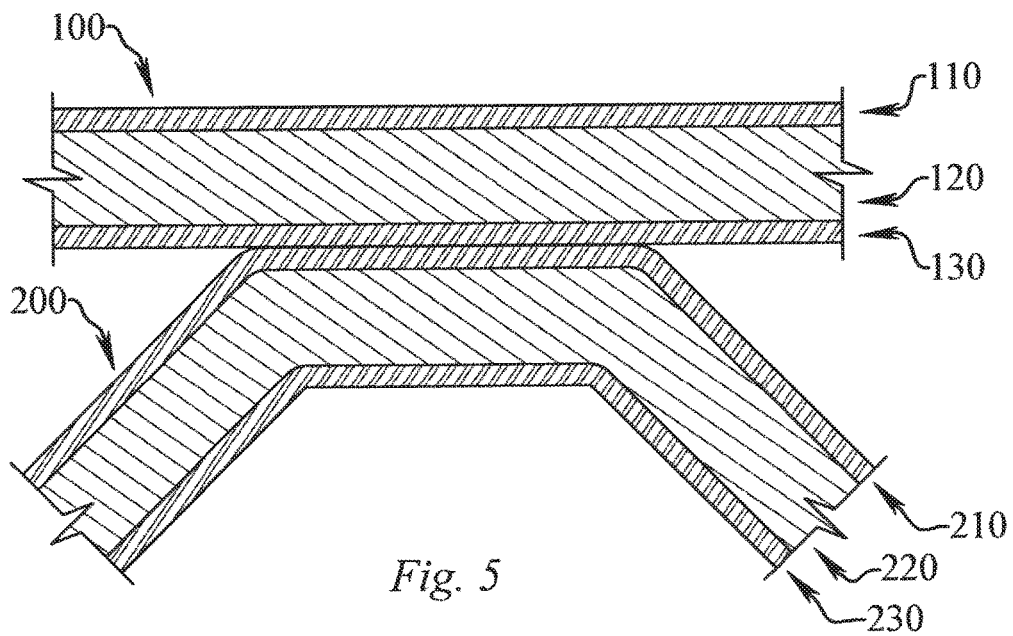
FIG. 5 shows a schematic cross-sectional view of two workpieces prior to joining.

The conduction heating source 600 may be any heating device that can conductively heat the first workpiece distal coating layer 130 to a processing temperature above the first workpiece distal coating layer 130 melting point within the required heating time period. The conduction heating source 600 may be placed in contact with either the first workpiece 100 or the second workpiece 200 to conductively heat the first workpiece distal coating layer 130. Alternatively, multiple conduction heating sources 600, as seen in FIG. 4, may be used to further increase the speed of the method. Further, the conduction heating source 600 may be in the form of a bar or plate that is simply placed on one of the workpieces to bond a portion of the structure, which is then advanced to bond the next area in a step-wise manner, or the conduction heating source 600 may be designed to bond every portion of the structure 50 that needs bonding in a single cycle. Alternatively, the conduction heating source 600 may be in the form of a roller than facilitates relative movement between the conduction heating source 600 and the first workpiece distal coating layer 130 to produce a continuous bonding environment. With reference now to FIG. 2, one skilled in the art will understand that the conductive heating source 600 may be heating in any number of ways. Then, since the conductive heating source 600 is at a higher temperature than the first workpiece distal coating layer 130, and in contact with at least one of the workpieces, heat is conductively transferred from the conductive heating source 600 to the first workpiece distal coating layer 130. In FIG. 2, the first workpiece distal coating layer 130 is located between the first workpiece 100 and the second workpiece 200 and the heat is conductively transferred through the first workpiece 100 to heat and melt a portion of the first workpiece distal coating layer 130, however the heat may be conductively transferred through the second workpiece 200 to melt a portion of the first workpiece distal coating layer 130.

Figure 7:
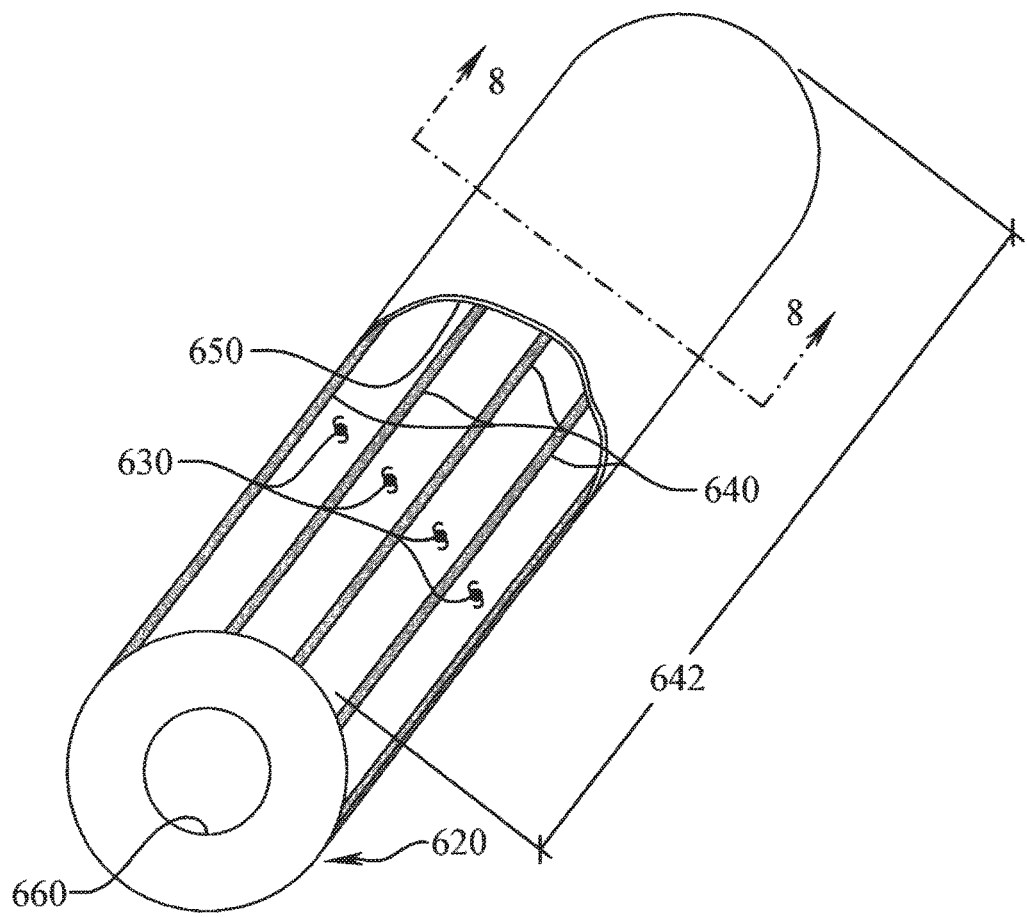
FIG. 7 shows a schematic isometric view of an embodiment of a resistive heat generation roller.

The conduction heating source 600 may itself be heating in any number of ways, including, but not limited to, radiant heating, induction heating, infrared heating, and resistive heating, just to name a few. In one of many embodiments, the conduction heating source 600 is a resistive heat generation device 610. In this embodiment the resistive heat generation device 610 is resistively heated by the passage of electrical current through the resistive heat generative device 610, thereby elevating the temperature of the resistive heat generation device 610, which then conductively transfers heat to the first workpiece distal coating layer 130. The current may be current that is induced in the resistive heat generation device 610, or it may be current originating with a power source that is in electrical communication with the resistive heat generation device 610. In another embodiment the resistive heat generation device 610 may include a high electrical resistivity insulator 650, seen in FIGS. 7 and 8, in contact with the bonded structure 50 to further guard against the passage of electrical current form the resistive heat generation device 610 to the bonded structure, and to reduce the amount of coating material that adheres to the resistive heat generation device 610. Thus, the high electrical resistivity insulator 650 may be constructed of materials that resist wetting of the melted coatings. In one particularly effective embodiment the electrical resistivity of the high electrical resistivity insulator 650 is at least one hundred times greater than the electrical resistivity of the current carrying portion of the resistive heat generation device 610. Yet another embodiment has a thermal conductivity of the high electrical resistivity insulator 650 that is at least fifty percent of the thermal conductivity of the current carrying portion of the resistive heat generation device 610. In another embodiment, the high electrical resistivity insulator 650 has an electrical resistivity of at least $10^{13}$ ohm-cm and a thermal conductivity of at least 150 W/m° K, thereby guarding against the passage of electrical current into the structure 50 while facilitating effective conductive heat transfer to the structure 50. An even further embodiment has found desirable performance utilizing a higher electrical resistivity insulator 650 constructed of aluminum nitride in light of desirable electrical and heat transfer properties, as well as its resistance to wetting by melted coating materials. An aluminum nitride high electrical resistivity insulator 650 may have an insulator thickness 652 as little as 1 mm and still provide the desired performance.

In another embodiment the movement of electrical current through a portion of the resistive heat generation roller 620 is further refined by controlling the current path within the resistive heat generation roller 620 to reduce the amount of power required to resistively heat the roller 620 at the point of contact with the structure 50 to a contact surface setpoint temperature above the melting temperature of the first workpiece distal coating layer 130. Thus, one embodiment of the method allows the current to flow into the resistive heat generation roller 620 at a point near the circumference of the resistive heat generation roller 620, and near to the first workpiece distal coating layer 130, while the exit point from the resistive heat generation roller 620 is longitudinally at the opposite end of the resistive heat generation roller 620, but also at a point near the circumference of the resistive heat generation roller 620, and near to the first workpiece distal coating layer 130, as illustrated nicely in FIGS. 11 and 15. For example, consider the embodiment of FIG. 2, since the first workpiece distal coating layer 130 is located between the first workpiece 100 and the second workpiece 200, it may be desirable to only resistively heat the conductive heating source 600 nearest the contact point with the first workpiece. In other words, in this embodiment, the electrical current path is controlled so that it enters the roller near the contact point with the first workpiece 100, and the current traverses the roller 620 longitudinally near the contact point with the first workpiece 100, thus near the perimeter of the roller 620, until it exits the roller 620 at the opposite end of the roller 620, yet still near the contact point with the first workpiece 100. However, as this current path through the roller 620 heats up the current path tends to move further and further away from the roller-to-workpiece contact point, i.e. more toward the center of the roller 620, thereby heating up more of the roller 620 than necessary.

In yet another embodiment, this same principal is incorporated in any of the embodiments disclosed herein, whereby the current is induced in the roller 620. For instance, the embodiments of FIGS. 20-25 illustrate at least one induction heating source 700 inducing an electrical current within the resistive heat generation roller 620.

In a further embodiment, the resistive heat generation roller 620 is constructed so that the electrical current passes through, or is induced within, the resistive heat generation roller 620 within a conduction distance 645, seen in FIG. 4, from the perimeter of the resistive heat generation roller 620, wherein the conduction distance 645 is less than twenty-five percent of the roller diameter 622. This may be accomplished by utilizing a hollow roller 620 or a multi-component roller 620 to keep the current flow near the perimeter of the roller 620. A further embodiment takes this a step further and maintains the current path even closer to the perimeter of the roller 620, in fact, in this embodiment the conduction distance 645 is less than twelve and one-half percent of the roller diameter 622.

Figure 25:
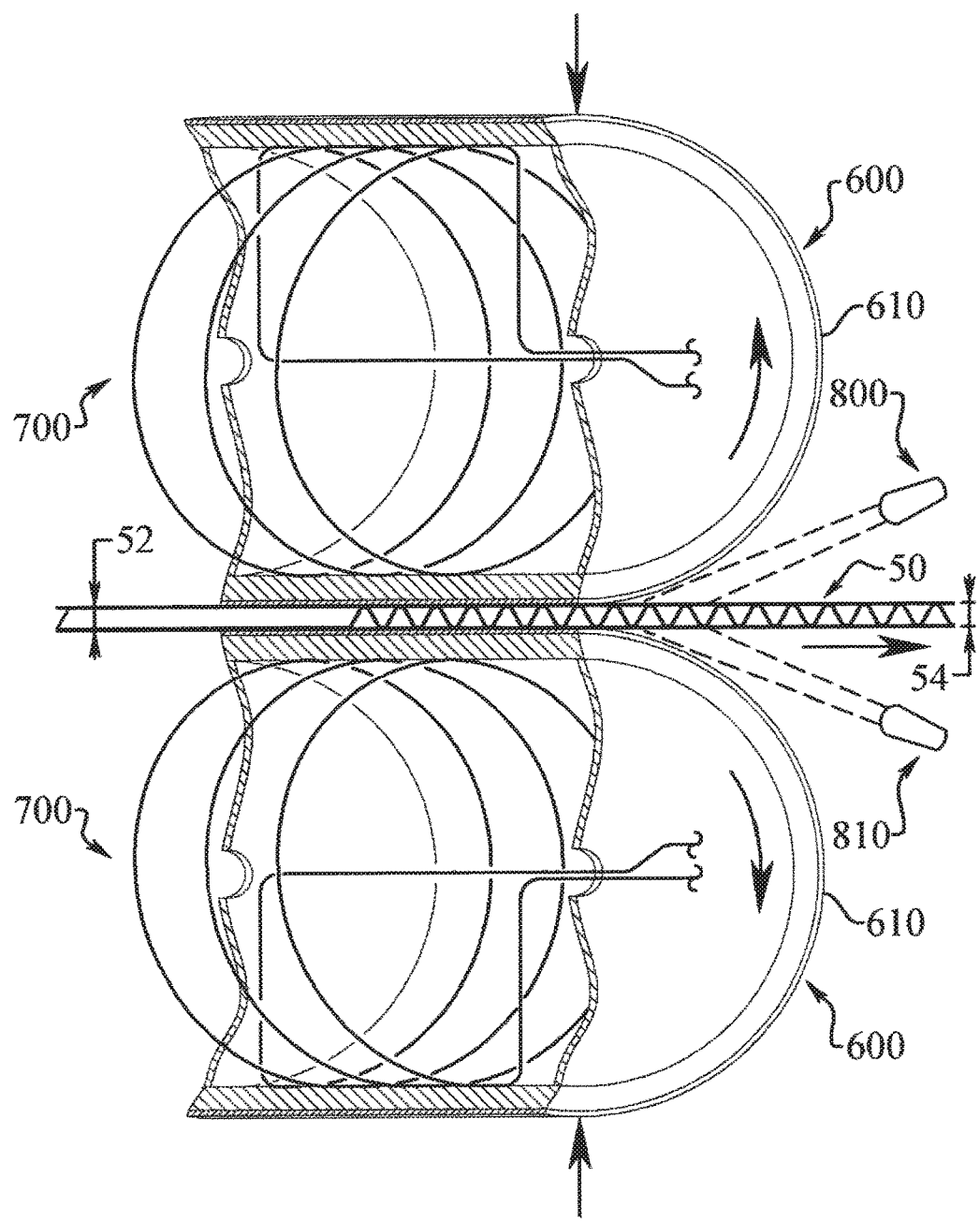
FIG. 25 shows a schematic isometric view of an embodiment of a resistive heat generation roller.

Another embodiment further controls the current path through the resistive heat generation roller 620 by dividing the roller 620 into sections. As illustrated in FIGS. 7, 8, 11, 16 and 17, in these embodiments the resistive heat generation roller 620 includes a plurality of resistive heat generation roller sections 630 separated from one another by a plurality of roller section gaps 640 preventing the passage of electrical current between adjacent resistive heat generation roller sections 630. Thus, the electrical current passes through no more than two of the plurality of resistive heat generation roller sections 630 at a time, thereby requiring less power to resistively heat the desired particular resistive heat generation roller sections 630 to a temperature that facilitates conductively heating a portion of the first workpiece distal coating layer 130 to its melting point. This same power conservation principle may be incorporated in the embodiments in which current is induced within the resistive heat generation roller 620 by constructing the roller largely of non-electrically conductive materials such that the induction heating source 700 only induces current in a small portion of the resistive heat generation roller 620. Additionally, further embodiments reduce power consumption by locating the induction heating source 700 internal to the resistive heat generation roller 620 as seen in FIG. 25.

Figure 8:
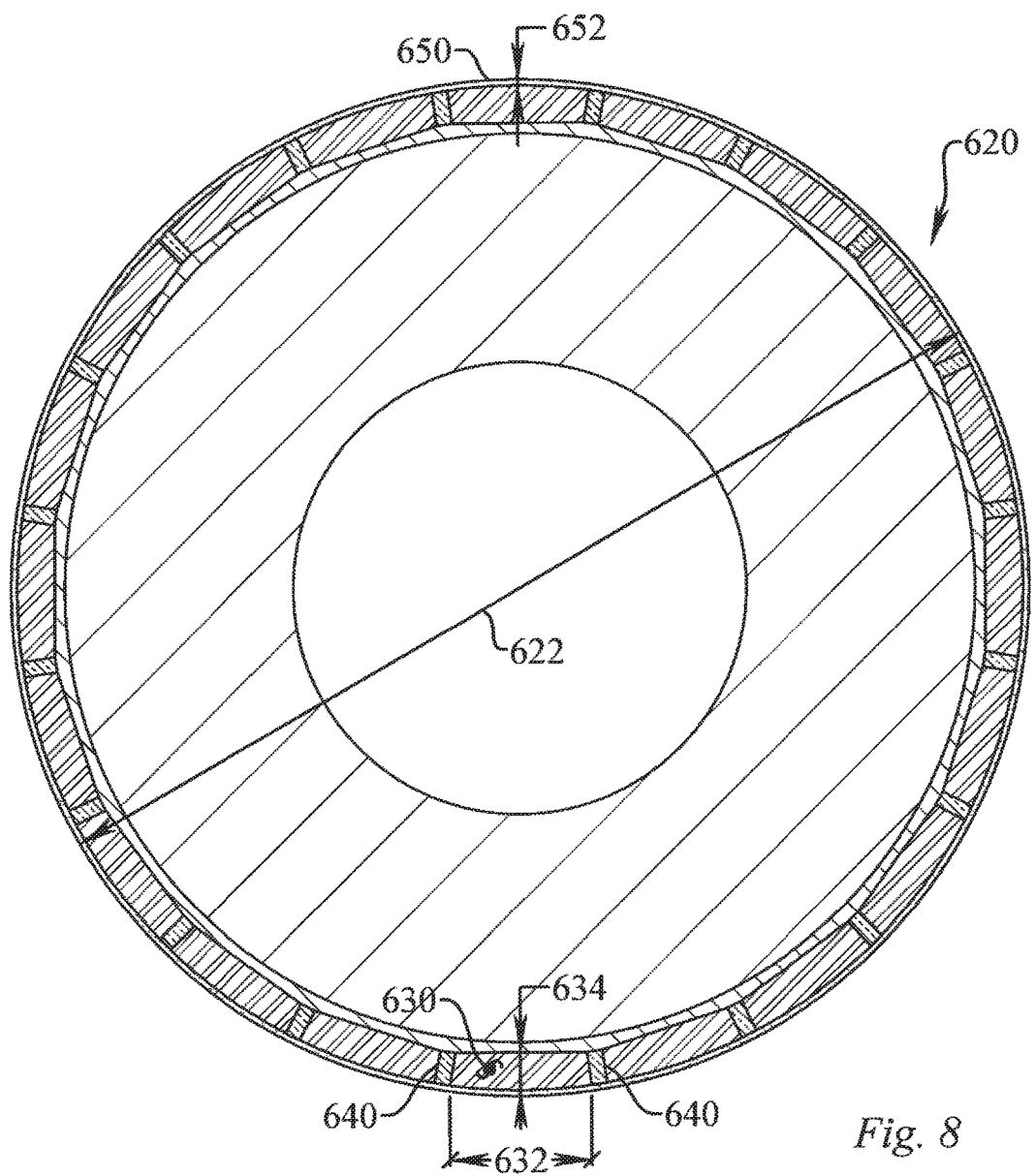
FIG. 8 shows a schematic cross-sectional view of an embodiment of a resistive heat generation roller.

As seen in FIG. 8, the heat generation roller 620 has a roller diameter 622, and thus a roller circumference, and the resistive heat generation roller section 630 has a section width 632, which is measured along the outermost surface of the roller section 630, and a section thickness 634, which is measured at the thickest portion of the roller section 630. One particular embodiment directs the current through the resistive heat generation roller 620 by having the section width 632 of the current carrying resistive heat generation roller section 630 be less than seventy-five percent of the roller diameter 622. Further, separate embodiments even more narrowly control the current path through the resistive heat generation roller 620 by reducing the section width 632 of the current carrying resistive heat generation roller section 630 to less than forty percent of the roller diameter 622. Yet another embodiment narrows the section width even further by having the section width 632 of the current carrying resistive heat generation roller section 630 that is less than thirty percent of the roller diameter 622. As one skilled in the art will appreciate, these unique relationships may produce embodiments with 20, or more, separate resistive heat generation roller sections 630, as seen in FIG. 8. Still further, the embodiment illustrated in FIG. 16 has more than 40 resistive heat generation roller sections 630 to further take advantage of this unique relationship and reduce the power requirements by selectively heating only a portion of the resistive heat generation roller 620.

The conductive heating step further includes passing electrical current through, or inducing current within, a resistive heat generation device 610 that is in contact with the structure thereby resistively heating the resistive heat generation device 610 without passing electrical current through the structure, and the resistive heat generation device 610 subsequently conductively transfers heat to either, or both, the first workpiece distal coating layer 130 and the second workpiece proximal coating layer 210. In one particular embodiment the amount of current passed through, or induced within the resistive heat generation device 610 is carefully controlled and associated with a unique combination of variables. In this embodiment the current is related to the longitudinal travel speed of the workpieces and the required contact surface setpoint temperature according to the following equation; $I=[(density/resistivity)*(resistive\ heat\ generation\ roller\ section\ thickness)^2*(resistive\ heat\ generation\ roller\ section\ width)*(structure\ travel\ speed)*(contact\ surface\ setpoint\ temperature-ambient\ temperature)]^{0.5}*(resistive\ roll\ current\ constant)$. In this embodiment the resistive roll current constant ranges from 0.8 to 1.2, and the density, resistivity, and heat capacity refers to those values for the workpiece parent material layer. Often the first workpiece parent material layer 120 and the second workpiece parent material layer 220 will be composed of the same material and therefore will have the same density, resistivity, and heat capacity, however this is not required. In the case when first workpiece parent material layer 120 and the second workpiece parent material layer 220 are composed of different materials, the current calculation shall be performed for each material and the larger of the two values transmitted through the resistive heat generation device 610.

The calculated current requirement may also be used to determine the necessary voltage. In one particular embodiment the voltage is carefully controlled and associated with a unique combination of variables. In this embodiment the voltage is related to the roller longitudinal contact length 642, the resistive heat generation roller section width 632, and the resistive heat generation roller section thickness 634, according to the following equation; $V=[(current)*(resistivity)*(roller\ longitudinal\ contact\ length)/(resistive\ heat\ generation\ roller\ section\ width*resistive\ heat\ generation\ roller\ section\ thickness)*(resistive\ roll\ voltage\ constant)$. In this embodiment the resistive roll voltage current ranges from 0.8 to 1.2, and the resistivity refers to the resistivity of the workpiece parent material layer 120. Often the first workpiece parent material layer and the second workpiece parent material layer 220 will be composed of the same material and therefore will have the same material properties, however this is not required. In the case when first workpiece parent material layer 120 and the second workpiece parent material layer 220 are composed of different materials, the voltage calculation shall be performed for each material and the larger of the two values transmitted through the resistive heat generation device 610.

The resistive heat generation roller 620 may be made of any material that possesses enough electrical resistance to achieve the desired contact surface setpoint temperature within the necessary heating period, and possesses desirable mechanical properties at elevated temperatures. In one particular embodiment the heat generation roller sections 630 are constructed of a molybdenum alloy, however yet another embodiment incorporates a resistive heat generation roller 620 in which the electrically conductive portion is constructed of Inconel. Perhaps more importantly, the coefficient of thermal expansion of the resistive heat generation device 610 should be similar to the coefficient of thermal expansion of the high electrical resistivity insulator 650, ideally differing by no more than twenty percent. In fact, one embodiment utilizes select materials to obtain coefficients of thermal expansion that differ by less than $1.0\times10^{-6}$/K, thereby limiting different expansion at elevated temperatures between the resistive heat generation device 610 and the high electrical resistivity insulator 650 to increase the useful life of the conductive heating source 600. One such material combination incorporates a high electrical resistivity insulator 650 of aluminum nitride with a resistive heat generation device 610 of a molybdenum alloy, thereby closely matching the coefficients of thermal expansion and providing the desired electrical properties of both elements, while ensuring adequate conductive heat transfer and resistance to wetting from the melting coating material. Another such material combination incorporates a high electrical resistivity insulator 650 of aluminum nitride with a resistive heat generation device 610 of a nickel-based alloy, thereby closely matching the coefficients of thermal expansion and providing the desired electrical properties of both elements, while ensuring adequate conductive heat transfer and resistance to wetting from the melting coating material.

Figure 11:
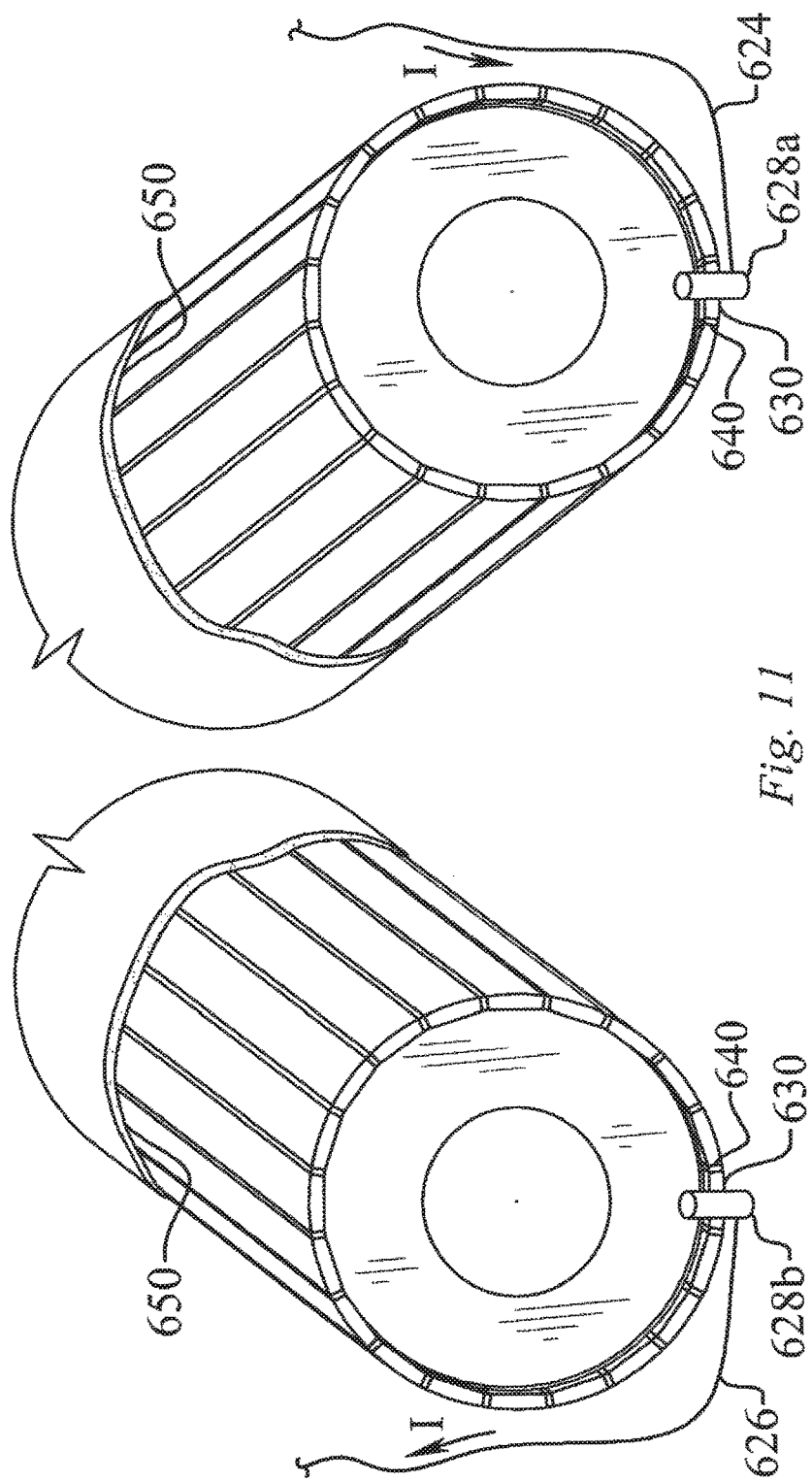
FIG. 11 shows a schematic split isometric view of an embodiment of a resistive heat generation roller.
Figure 15:
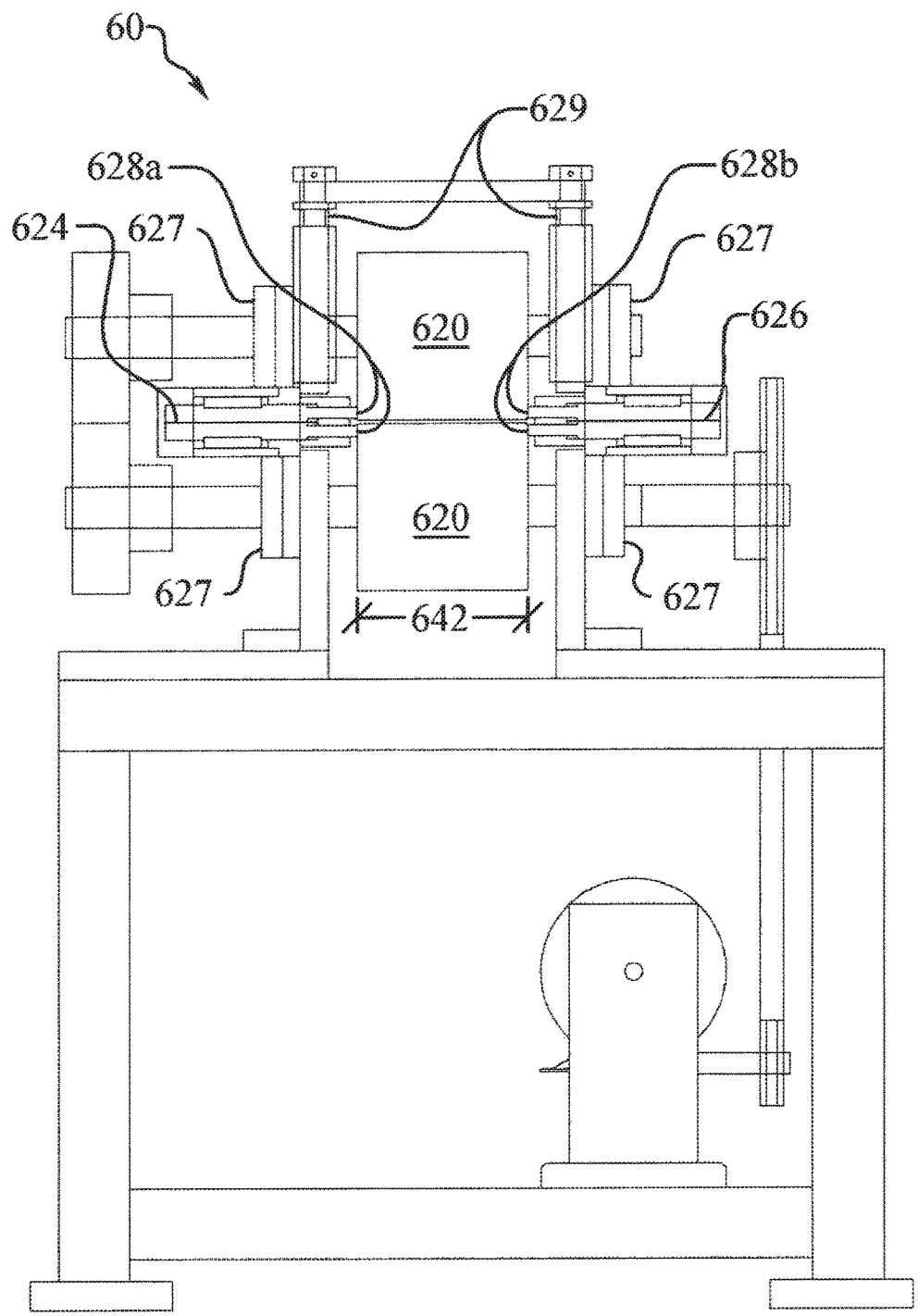
FIG. 15 shows a schematic front elevational view of an embodiment of a conductive heat roll joining apparatus.

Controlling the passage of electrical current through no more than two of the plurality of resistive heat generation roller sections 630 at a time as the resistive heat generation roller 620 rotates requires a special current flow path. One such embodiment is illustrated schematically in FIG. 11. In this embodiment, current flows from the input conductor 624 through an input contactor 628a to no more than two of the resistive heat generation roller sections 630. The roller section 630 is resistively heated and the current leaves the roller section 630 through an output contactor 628b connected to an output conductor 626. The input contactor 628a and the output contactor 628b are stationary, thereby dictating the position of the roller section 630 that is resistively heated, but they allow the resistive heat generation roller 620 to rotate while maintaining electrical continuity from the input conductor 624 to the output conductor 626. In a few additional embodiments, the input contactor 628a and the output contactor 628b may be roller contacts, as schematically illustrated in FIG. 11, or sliding contacts, as schematically illustrated in FIG. 15. Further, the input contactor 628a and the output contractor 628b may be biased to maintain a biasing force against the resistive heat generation roller 620, and may be sized to account for the roller section gaps 640 such that there may be a short period in which current is directed into two adjacent roller sections 630. In one particular embodiment the input contactor 628a exerts a contract force of at least 50 lbf to the current carrying resistive heat generation roller 620 and the output contactor 628b exerts a contact force at least 40 lbf to the current carrying resistive heat generation roller 620. The contact force of the input contactor 628a and the output contactor 628b have to be carefully balanced with the torque such a force adds to the resistive heat generation roller 620 resistance to rotating, yet the contact force must be high enough to ensure that the contactor and the associated interface to the resistive heat generation roller 620, are not a large portion of the overall electrical resistance in the current path from the input contactor 628a through the resistive heat generation roller 620 and out the output contractor 628b. In one particular embodiment the input and output contact forces are each approximately 100 lbf, which does not add an unduly large torque on the resistive heat generation roller 620 while ensuring that the electrical resistance associated with the contactors 628a, 628b and associated interfaces is less than twenty percent of the electrical resistance of a resistive heat generation roller section 630. In yet another embodiment the contactors 628a, 628b are liquid cooled.

The plurality of roller section gaps 640 prevents the passage of electrical current between adjacent resistive heat generation roller sections 630. The gaps 640 may simply be voids between the adjacent resistive heat generation roller sections 630. One embodiment incorporates gaps 640 that separate adjacent resistive heat generation roller sections 630 by at least one percent of the section width 632. In another embodiment the gaps 640 are at least 0.25 mm, thereby ensuring electrical current does not pass between adjacent sections 630. In even further embodiments the gap 640 is reduced by filling the gap 640 with an electrical insulator to prevent current passage, and providing a convenient method of ensuring a consistent gap size between the resistive heat generation roller sections 630. In yet another embodiment the high resistivity insulator 650 partially fills the roller section gaps 640.

In addition to controlling the current pathway through the resistive heat generation roller 620 via the current input and output contact points, as well as through the use of multiple resistive heat generation roller sections 630, additional methods of controlling the current pathway through the resistive heat generation roller 620 include careful selection of the materials of the resistive heat generation roller 620 and by creating localized areas of the roller 620 having higher resistance to the flow of current, or areas of the roller 620 that are constructed of non-electricity conductive materials. One additional method of controlling the current pathway is to vary the thickness of the current carrying portion of the resistive heat generation roller 620. Further, the resistive heat generation roller 620 may include one, or more, selective cooling systems to maintain localization of the roll hot zone, even with an implicit diffuse current density.

Figure 12:
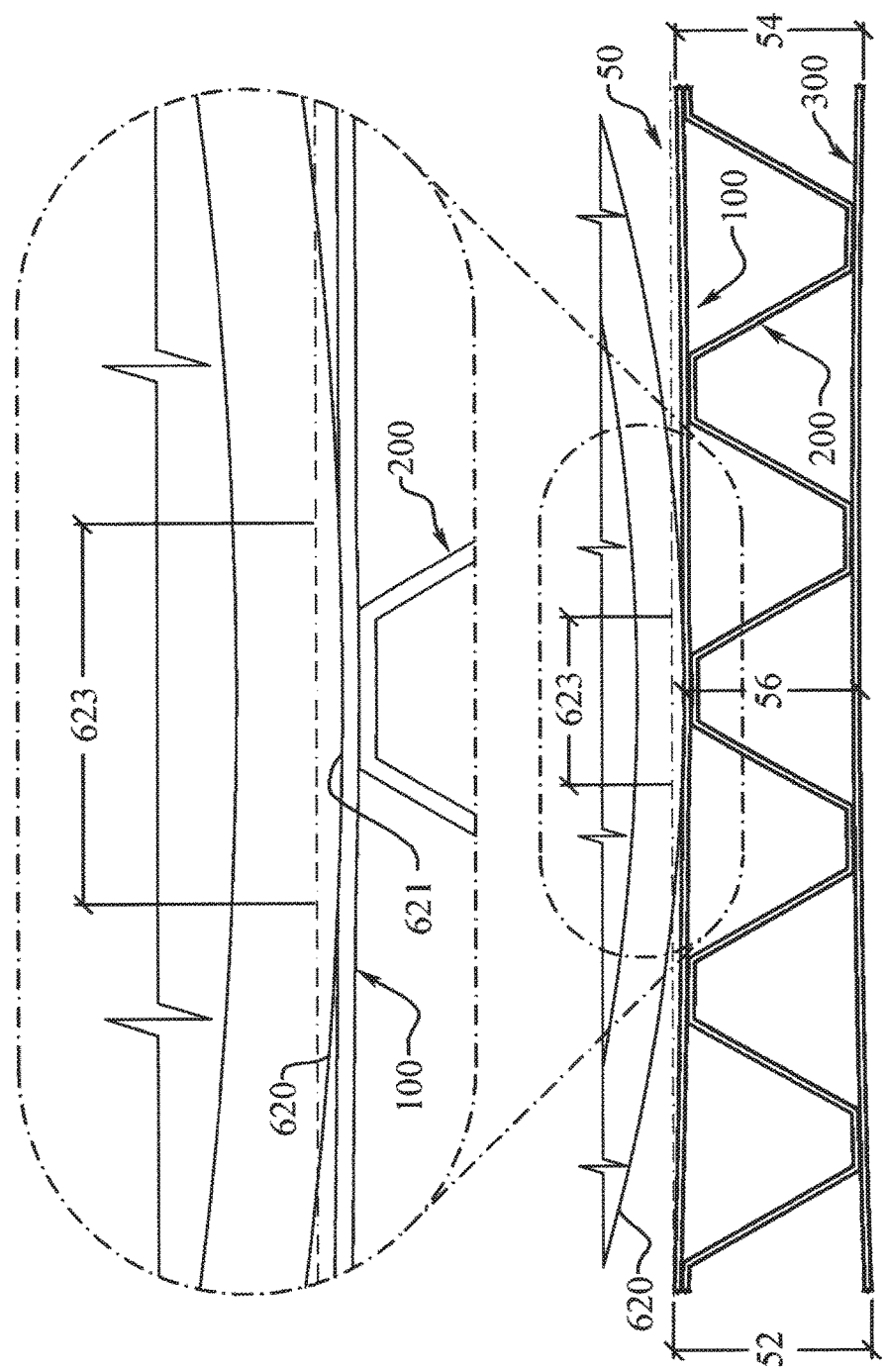
FIG. 12 shows a schematic side elevational view of three workpieces during the joining process.

One skilled in the art will recognize the fact that the area of contact between a cylindrical object and a flat surface is a line. A line contact area is not the preferred contact configuration for conductive transfer heat. As such, another embodiment of the claimed methods further includes the step of compressing at least one of the first workpiece 100 and the second workpiece 200 from an unbonded structure initial thickness 52 to a bonding thickness 56, as illustrated in FIG. 12. In this particular embodiment the compression results in a bonding thickness 56 that is at least 2 percent less than the initial thickness 52, thereby increasing a roller transverse contact length 632 of the resistive heat general roller 620 to the bonded structure to at least one percent of a roller diameter 622. The roller transverse contact length 623 is measured in the direction that the resistive heat generation roller 620 rotates from the point at which roller 620 and structure 50 first come in contact to the point at which they are no longer in contact, and is measured along the associated contact curve. Yet another embodiment further includes the step of compressing at least one of the first workpiece 100 and the second workpiece 200 from an unbonded structure initial thickness 52 to a bonding thickness 56, wherein the bonding thickness 56 is at least 2 percent less than the initial thickness 52 thereby increasing a roller transverse contact length 623 of the resistive heat general roller 620 to the structure to at least five percent of the section width 630. Alternatively, another similar embodiment incorporating relatively flexible workpieces simply deflects the structure 50 around the resistive heat generation roller 620, rather than compressing the structure 50, to achieve the same benefits. In some embodiments there may be some degree of spring-back from the bonding thickness 56 to a structure joined thickness 54, which can further increase the roller transverse contact length 623. Increasing the contact area, and thus the contact time, between the resistive heat generation roller 620 and the structure 50 allows for greater conductive heat transfer to melt a portion of the first workpiece distal coating layer 130. In fact, one particular embodiment produces a bonded structure 50 that has a structure joined thickness 54 is at least five percent less than the structure initial thickness 52.

The temperature rise in the structure 50 following initial contact with the resistive heat generation roller 620 can be defined as:

$$T - T_o = (T_{roll} - T_o) - \frac{4(T_{roll} - T_o)}{\pi} \sum_{n=0}^{\infty} \frac{(-1)^n}{2n+1} \exp\left(-\frac{\alpha(2n+1)^2\pi^2}{4(t_1+t_2)^2}\frac{x}{S}\right)$$

Where, in a two workpiece embodiment such as that illustrated in FIG. 2:
$t_1$=first workpiece overall thickness 102;
$t_2$=second workpiece formed thickness 204;
x=distance traveled along the roller transverse contact length 623;
$T_{roll}$—contact surface setpoint temperature;
$T_o$=ambient temperature;
S=structure travel speed; and
α=thermal diffusivity.

This relationship is then used to define the necessary roller transverse contact length 623 to allow the structure 50 to achieve the equilibrium contact surface setpoint temperature ($T_{roll}$), while considering the structure travel speed S. The roller diameter 622 can then be related to the roller transverse contact length 623 and the amount of compression of the structure 50 by the resistive heat generation roller 620. The amount of compression is measured as the reduction from the structure initial thickness 52 to the bonding thickness 56, as seen in FIG. 12. Thus, the roller diameter=[(roller transverse contact length)$^2$+4*(compression)]/(4*(compression)). Then, in one embodiment the compression is limited to ten percent, thereby yielding a final result of roller diameter=[50*(roller transverse contact length)$^2$+2*$(t_1+t_2)^2$]/[20*$(t_1+t_2)$]. In yet another embodiment the compression preferably results in a bonding thickness 56 that is at least 2 percent less than the initial thickness 52, thereby increasing a roller transverse contact length 623 of the resistive heat general roller 620 to the bonded structure to at least one percent of a roller diameter 622, but less than 10 percent less than the initial thickness 52, to avoid stresses and a tendency to spring back and pull the joint apart.

Now, with a multitude of embodiments disclosed with respect to the method of creating the structure 50, one particular embodiment of a conductive heat roll joining apparatus 60 will be disclosed in detail, however this is not the only configuration that may carry out the disclosed methods. In fact, for the sake of simplicity, the presently discussed embodiment is a very small conductive heat roll joining apparatus 60 having rollers 620 that are less than twelve inches long. The disclosed methods may be used to produce structures 50 that are significantly wider by incorporating rollers 620 that are many feet in length. With reference now to FIGS. 13-24, this particular embodiment of the apparatus 60 includes two resistive heat generation rollers 620, however as previously disclosed, and illustrated in FIGS. 2 and 12, only one resistive heat generation roller 620 is necessary. The embodiment of FIG. 13 includes an inlet feed guide 62 and an outlet feed guide to guide 64 the structure through the apparatus 60. Each of the resistive heat generation rollers 620 of this embodiment are mounted on a central shaft 625, which is supported by a shaft mount 627 at each end, seen in FIG. 14. A front elevation view of the apparatus 60 is illustrated in FIG. 15 showing the inlet side of the two resistive heat generation rollers 620. The at least one resistive heat generation roller 620 of the conductive heat roll joining apparatus 60 may include any of the previously disclosed resistive heat generation rollers 620, however, the specific embodiment illustrated in FIGS. 16 and 17 include multiple resistive heat generation roller sections 630 held to the central shaft 625 via an electrically insulated section retainer 636. In this embodiment the section retainer 636 is an insulated stainless steel compression band, however the sections 630 may be mounted to, or bonded to, the central shaft 625 in any number of manners.

The upper roller shaft mounts 627 and the lower roller shaft mounts 627 are independently mounted to the apparatus 60 so that the amount of space between the rollers 620 may be adjusted. Further, the apparatus 60 may include a load control system 629, seen in FIG. 15, that is used to adjust the space between the rollers 620, and optionally may apply a load to at least one of the central shafts 625, and thus at least one of the rollers 620. The load control system 629 may be mechanical, hydraulic, pneumatic, or electromagnetic, just to name a few of the methods of applying a load to the central shaft 625. The load control system 629 may be manual or automatic. For example, in one embodiment the load control system 629 may be set to automatically adjust the load applied to the central shaft 625 to obtain a desired compression, deflection, or constant bonding forced regardless of structure thickness. Sensors may be included in the apparatus 60 to monitor such variables and send information back to the load control system 629 for analysis and to make any necessary adjustments to the load applied to the central shaft 625 throughout the relative movement of the structure 50 and the rollers 620. One particular embodiment includes the step of applying a compressive load of at least 250 N to the structure during the solidification process. Similarly, the induction heating source 700 may be independently mounted to the apparatus 60 so that the amount of space between the induction heating source 700 and the rollers 620 may be adjusted.

Any of the embodiments may further include the step of cooling the conductive heating source 600 to ensure operational efficiency and the desired heat transfer to the first workpiece distal coating layer 130. Such cooling may be carried out with at least one resistive heat generation device cooling passageway 660, illustrated in FIGS. 7 and 17. The cooling passageway 660 may improve passive cooling of the conduction heating source 600, or may be an active cooling passageway 660 through which a cooling fluid may flow.

Figure 13:
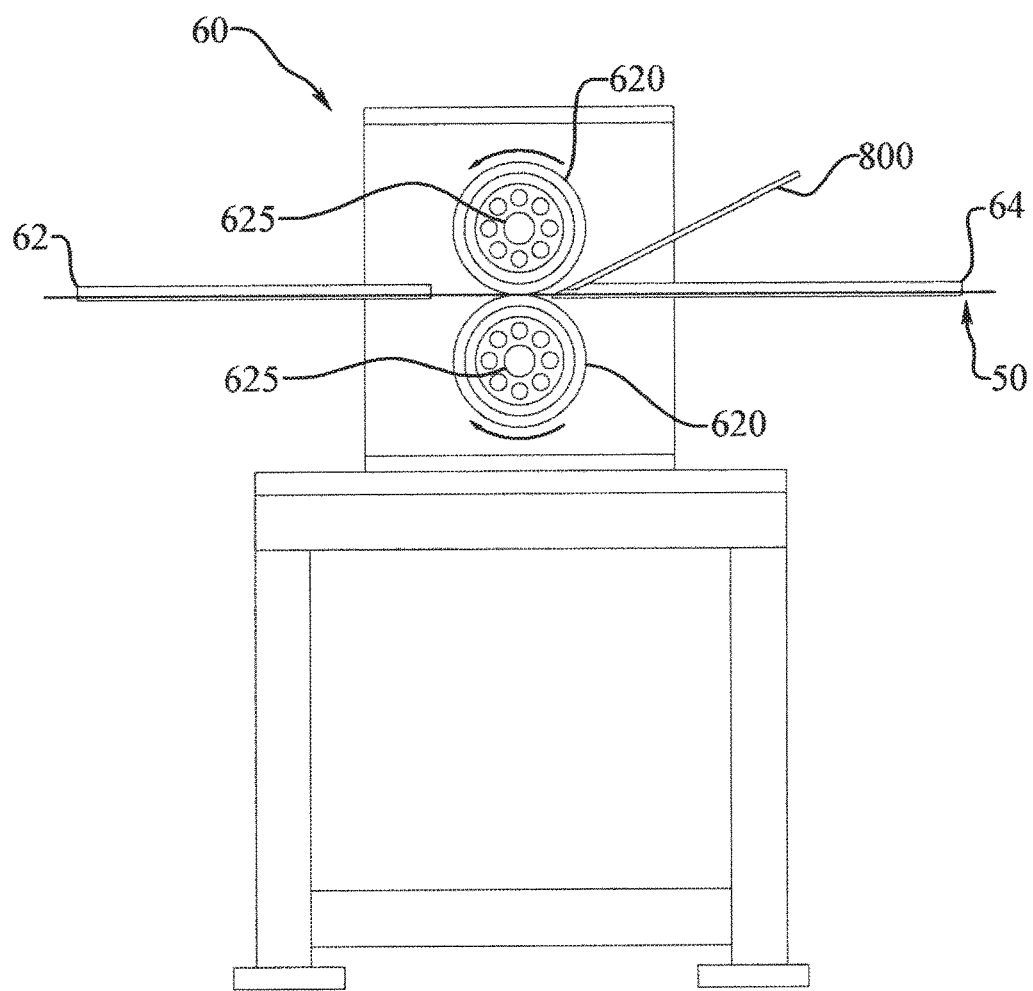
FIG. 13 shows a schematic cross-sectional view of an embodiment of a conductive heat roll joining apparatus.
Figure 14:
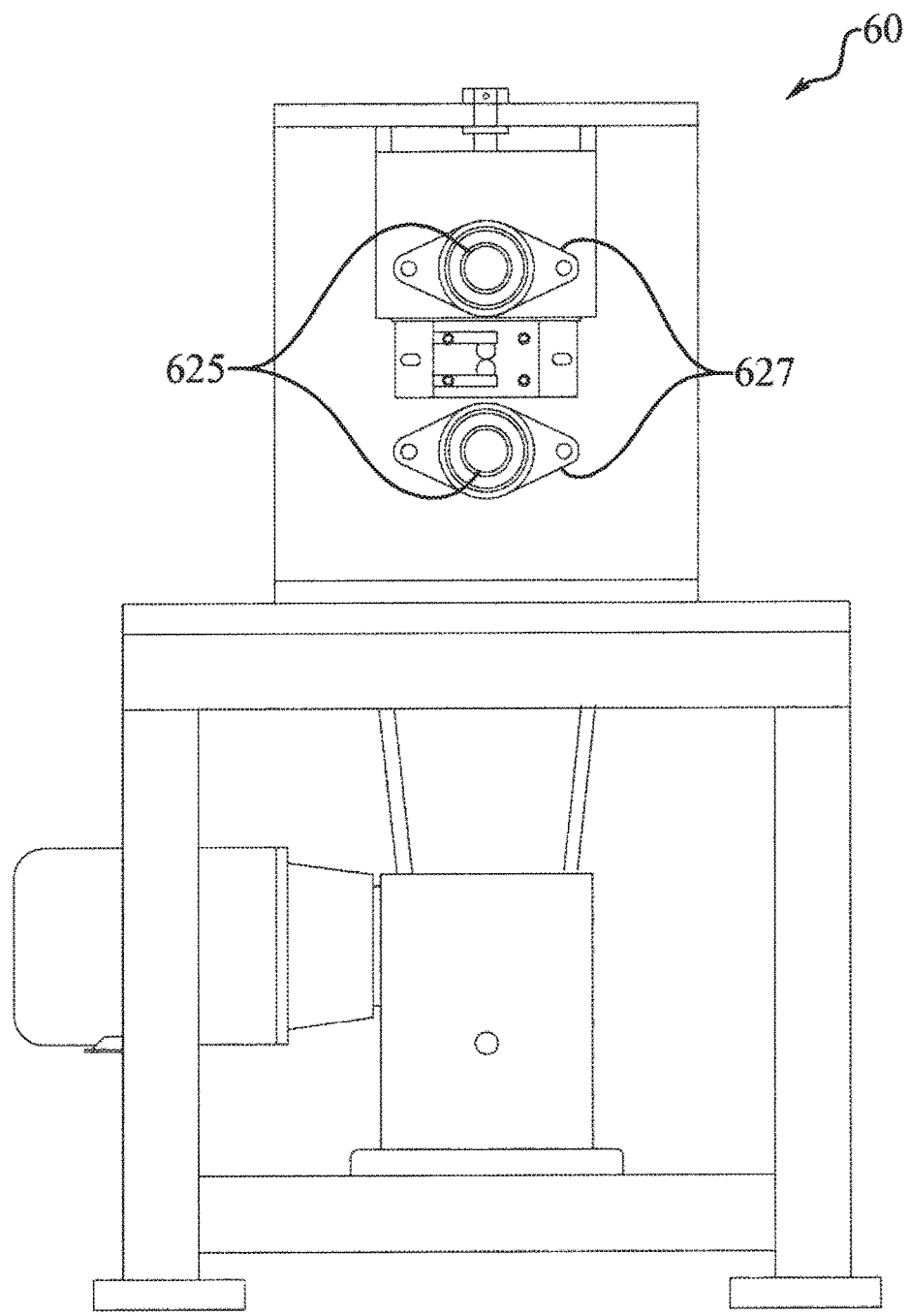
FIG. 14 shows a schematic side elevational view of an embodiment of a conductive heat roll joining apparatus.

Now, returning to the step of cooling the substantially liquid zone to solidification in a cooling time period to create a bonded connection 900, wherein the combination of the heating time period and the cooling time period is less than 10 seconds; the cooling may be carried out in any number of ways. For example, the structure 50 may be cooled with a fluid spray system 810, as seen in FIG. 4, or the structure 50 may incorporate a flood cooling system incorporated into an outlet feed guide 64, as seen in FIG. 13, thereby further selectively cooling the exit side of the conductive heating source 600. Alternatively, the structure 50 may be cooled with a cooling roller, often referred to as a quench roller, positioned immediately after the heating source 500. In addition to the cooling time period requirements disclosed, in one embodiment the step of cooling the substantially liquid zone with a cooling system 800 to solidification occurs within a distance of less than ten times the combined thickness of the first workpiece parent material layer thickness 122 and the second workpiece parent material layer thickness 222, further reducing the likelihood of movement between the workpieces prior to solidification and according reducing amount of external contact that must be placed on the structure 50 after it is heated.

Now, getting back to the zinc-based distal coating layer 130 previously discussed, the present methods may be used to create a bonded zinc-coated structure 50 by joining a first workpiece 100 having a zinc-based first workpiece proximal coating layer 110 and a zinc-based first workpiece distal coating layer 130 to a second workpiece 200 having a zinc-based second workpiece proximal coating layer 210 and a zinc-based second workpiece distal coating layer 230. Such zinc-based coatings may be applied to the workpieces 100, 200 in any number of widely known processes, including, but not limited to, hot-dip coating processes, electroplated coating processes, spray coating processes, powder coating processes, and cladding processes, just to name a few. Embodiments of the structure 50 incorporating sheet based workpieces are most commonly associated with hot-dip coating processes which are used to produce sheets having zinc-based coatings including, but not limited to galvanize, galvanneal, 55% aluminum-zinc alloy, zinc-5% aluminum alloy, and zinc-aluminum-magnesium alloy.

One particular embodiment with wide ranging applications utilizes the methods disclosed herein to create a galvanized structure 50 by joining a galvanized first workpiece 100 and a galvanized second workpiece 200. In this embodiments, with reference again to FIG. 3, all four coating layers, namely the first workpiece proximal coating layer 110, the first workpiece distal coating layer 130, the second workpiece proximal coating layer 210, and the second workpiece distal coating layer 230, hereafter referred to as the coating layers 110, 130, 210, 230, include zinc carbonate. In this embodiment, the combined mass of the first workpiece proximal coating layer 110 and the first workpiece distal coating layer 130 is at least 90 grams per square meter, and likewise the combined mass of the second workpiece proximal coating layer 210 and the second workpiece distal coating layer 230 is at least 90 grams per square meter. Thus, in this embodiment, for steel sheet products the workpieces 100, 200 may be defined by the ASTM designator system as having at least G30 (0.30 ounce per square foot of sheet) coatings in the inch-pound convention, or as having at least Z90 (90 grams per square meter of sheet) coatings in the S1 coating mass designation. Thus, even for very light gauge parent metal layer thicknesses, the coating layer thickness will be less than four percent of the parent material layer thickness. Further, it should be noted that the present methods and apparatuses are not limited to metallic parent materials or coating materials. The present galvanized embodiment is directed specifically to galvanized workpieces that have not been skin passed, or temper rolled.

Therefore, the methods and apparatuses disclosed herein facilitate the joining of two such zinc-coated workpieces to create a zinc-coated structure that maintains a zinc-coating around the bonded connection 900, seen in FIG. 6, so as to provide all the benefits traditionally afforded to zinc-coated workpieces, even around the connection point thus maintaining the desirable corrosion resistance. Thus, some would characterize one embodiment of the present disclosure as a method of creating a galvanized structure by brazing together two galvanized sheet based workpieces utilizing the galvanized coatings as the brazing alloy to produce a zinc-based bonded connection 900 without the undesirable attributes associated with conventional thinking regarding the volatilization issues commonly associated with zinc-based coatings. The presently defined methods quickly melt a portion of the zinc-based coating, while minimizing volitization and ensuring adequate reflow of the coating, and resolidify the coating under controlled conditions to produce a particularly effective bonded connection 900. These methods may be carried out without the use of a vacuum brazing chamber and free from flux.

While the prior disclosure with respect to hot-dip coatings refers to coatings commonly available today, the present embodiments of the present methods and apparatus may utilize custom coatings not bound by today's commonly available coating compositions. Such commonly available coating compositions include widely available galvanized coatings containing less than one-half percent aluminum, and zinc-aluminum hot-dip coatings four percent to six percent aluminum, but may include compositions containing aluminum in the one-half percent to four percent range as well. Alternative coating compositions may include eight percent to eleven percent iron, as well as compositions having at least fifty percent aluminum and approximately forty percent zinc. Likewise, the coating composition may include magnesium, such as in a zinc-aluminum-magnesium coating having four percent to twelve percent aluminum, and two percent magnesium. Further, embodiments of the coating layers containing aluminum may further containing four percent to twelve percent silicon. Further coating compositions may include nickel-phosphorus coatings, copper coatings, and copper-phosphorus coatings. While many of the coating compositions refer generally to sheet steel coatings, the present methods and apparatuses may utilize coating layers common for other widely available metals, including but not limited to, first workpiece distal coating layer 130 containing lead alloys and coatings containing tin, such as terne coatings.

Now, getting back to the heating and cooling time periods; the heating time period is the length of time required to heat the first workpiece distal coating layer 130 from an initial temperature to a processing temperature, wherein the processing temperature is above the melting point of the first workpiece distal coating layer 130, but below the melting point of the first workpiece parent material layer 120. Embodiments utilizing two coating layers in contact, such as that of FIG. 3, the coating layers are generally the same material, however that is not required. Thus, in these embodiments the heating time period is the length of time required to heat the first workpiece distal coating layer 130 and the second workpiece proximal coating layer 210 from an initial temperature to a processing temperature, wherein the processing temperature is above the greater of the melting point of the first workpiece distal coating layer 130 and the melting point of the second workpiece proximal coating layer 210.

The initial temperature is generally room temperature, but may be an elevated temperature if the workpiece has been preheated to accomplish another purpose. Thus, in one embodiment the initial temperature is less than 50 degrees Celsius. The present inventions and apparatus encompass the field of soldering as well as brazing and thus the processing temperature is not bound by the commonly accepted 400 degree Celsius differentiation point. However, the embodiments incorporating zinc-based coatings, or aluminum-based coatings, must clearly have a processing temperature above 400 degrees Celsius. In fact, these embodiments incorporate a processing temperature in excess of 410 degrees Celsius. Further, embodiments directed to the apparatus refer to another temperature, namely the contact surface setpoint.

One skilled in the art will appreciate that depending on the materials and thicknesses being joined to create the bonded structure 50, the contact surface setpoint is likely to be higher than the processing temperature so that the heat may be quickly conductively transferred to the first workpiece distal coating layer 130 and result in melting of a portion of the first workpiece distal coating layer 130. Thus, with respect to the apparatus 60, a contact surface setpoint period from the time that the resistive heat generation roller 620 beings increasing in temperature to the point at which the contact surface setpoint temperature is achieved is less than five seconds. This ensures that the combination of the heating time period and cooling time period, which relate to the changes of the first workpiece distal coating layer 130, is less than ten seconds, thereby providing adequate time to reflow of the liquid zone while avoiding significant volatilization and intermetallic formation.

With reference again to the zinc-based coating embodiments, the thermal cycle of the first workpiece distal coating layer 130 is likely to include conductively heating the coating layer 130 from less than 50 degrees Celsius to over 410 degrees Celsius, allowing for appropriate reflow while guarding against volatilization and intermetallic formation, and cooling the coating layer to less than 410 degrees Celsius in less than ten seconds. Further, embodiments of the present methods have achieved this cycle in far less than 10 seconds. In fact, bonded connection exhibiting good properties have been achieved with a heating time period of less than 7 seconds and a cooling time period of less than 1 second. Even further, acceptable zinc-based bonded connections have been achieved with a heating time period of less than 1 second and a cooling time period of less than 500 milliseconds. Still further, a heating time period of less than 400 milliseconds and a cooling time period of less than 200 milliseconds is achievable with the disclosed methods and apparatuses with a brazing temperature of 600 degrees Celsius joining three 0.2 mm thick workpieces to create a 1.5 mm thick bonded galvanized structure having approximately 5 micrometer thick galvanized layer at the bonded connection 900 between the workpieces. These quick cycle times ensure that the liquid zone does not need to be externally constrained to produce a good bonded connection, and allow for high production rates. In fact, the very fast thermal cycle time of the present methods and apparatus facilitate production rates that include linear travel speeds of the structure in the range of 1 meter per minute up to 10 meters per minute.

The present methods and apparatuses may incorporate very fine temperature control, particularly when joining aluminum workpieces with aluminum-based coating layers where the temperature difference between that required to melt the coating layer and that required to melt the parent material may differ by as little as forty to fifty degrees Fahrenheit, and similar combinations. Again, the methods and apparatuses in this disclosure are not limited to any one particular parent material or any one particular coating material, and may be used to join any combination of workpieces provided one of the workpieces has a coating layer that may be conductively heated to solidification as disclosed herein to bond the two workpieces together. For instance, aluminum is widely available in a precoated manner that may be bonded to another workpiece via the present methods and apparatuses. Likewise, stainless steel is widely available in a precoated manner that may be bonded to another workpiece via the present methods and apparatuses, such stainless steel embodiments include, but are not limited to, copper coated stainless steel. Further, the combinations of parent materials and coating materials may include electroless nickel plated mild steels. Further, as previously discussed, with the wide variety of coating techniques available, custom coating compositions may be developed and applied to workpieces so that they may take advantage of the efficiencies offered by the present methods and apparatuses.

Figure 19:
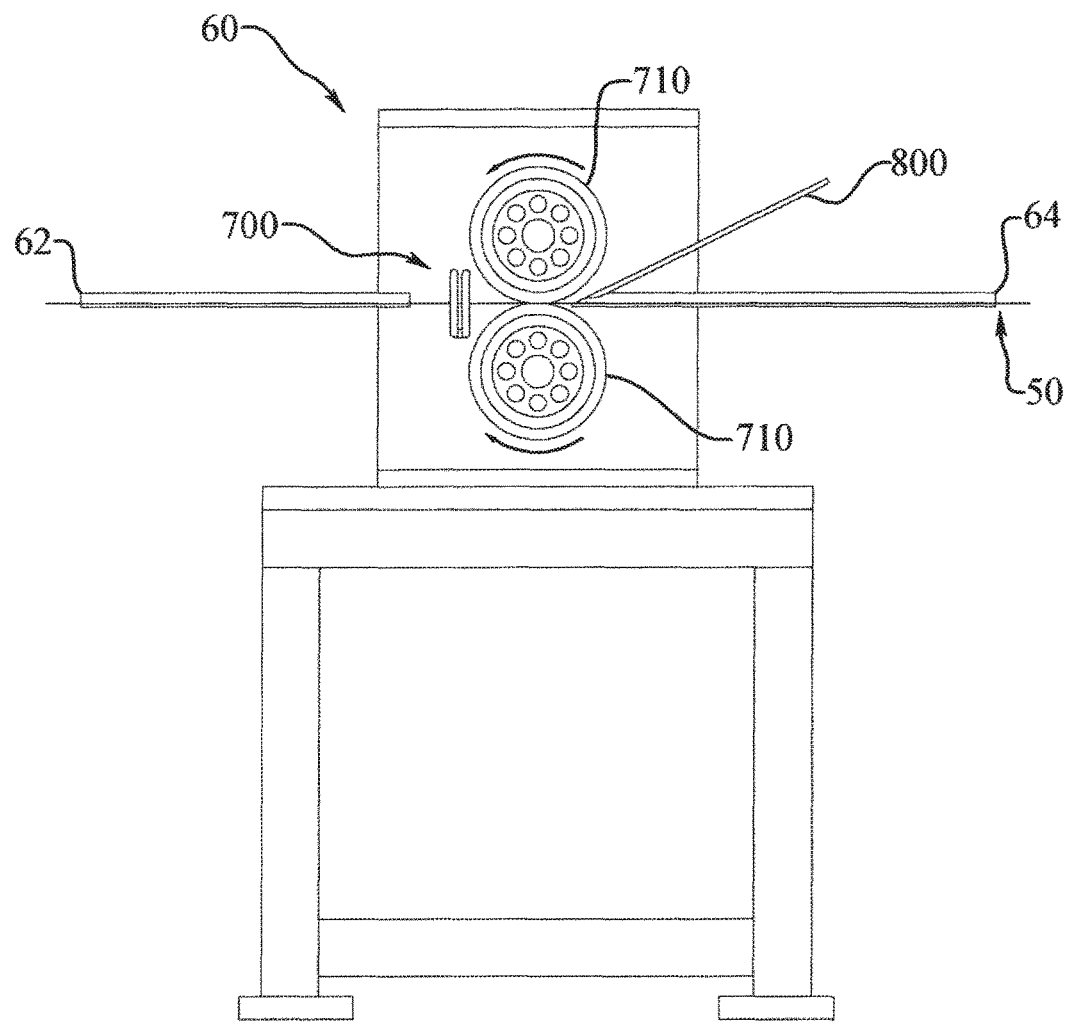
FIG. 19 shows a schematic cross-sectional view of an embodiment of an induction heating roll joining apparatus.
Figure 20:
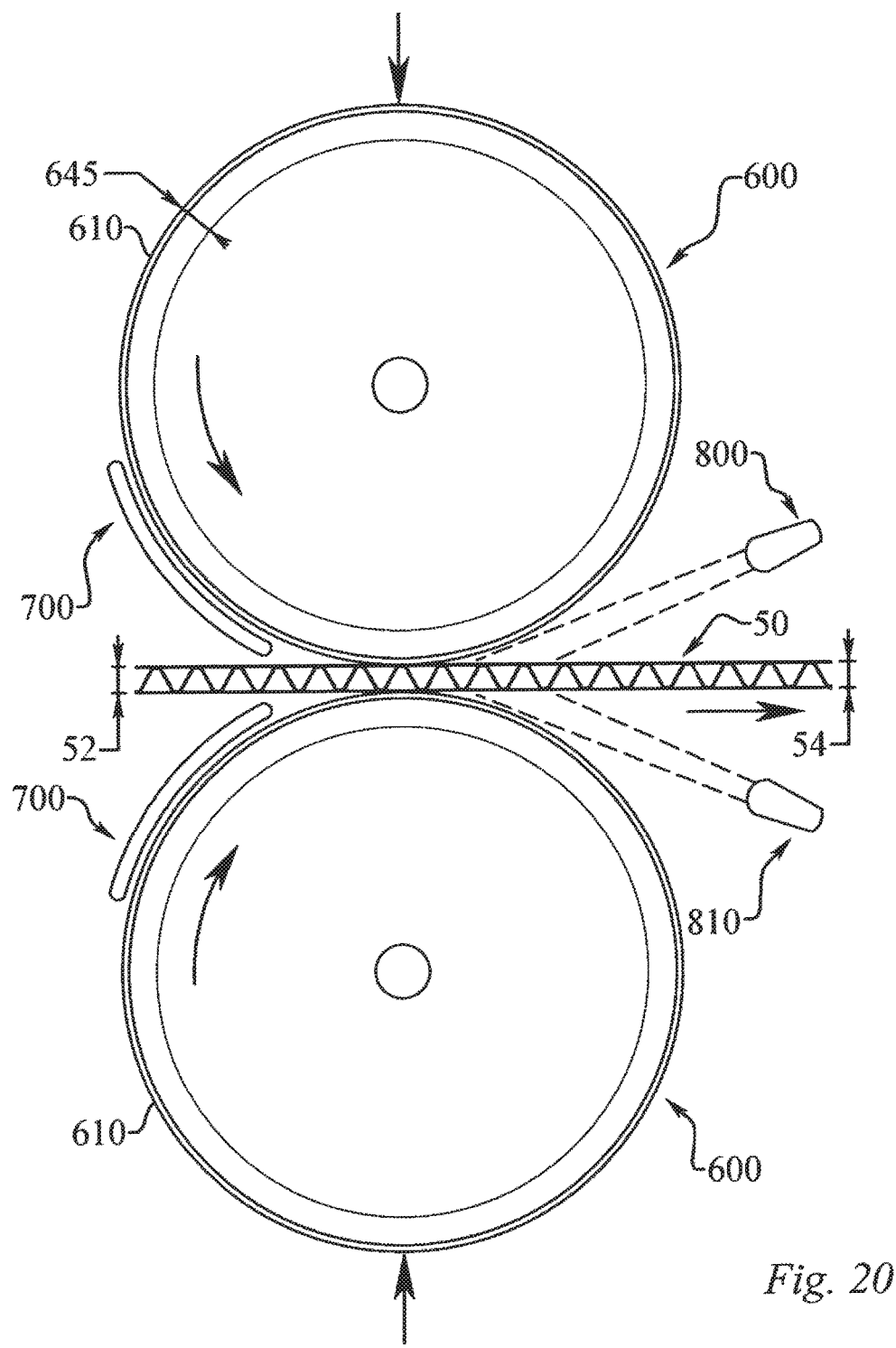
FIG. 20 shows a schematic side elevational view of two resistive heat generation devices creating a bonded structure.
Figure 21:
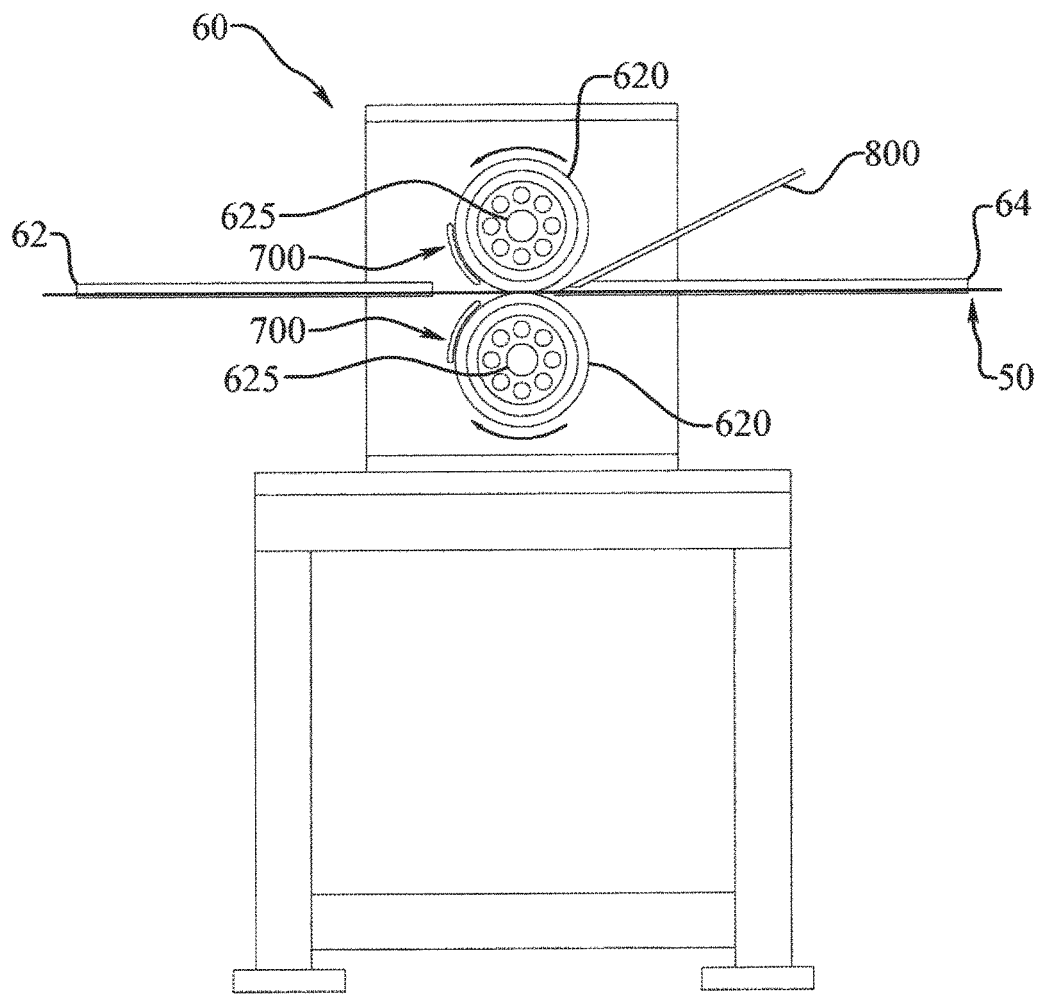
FIG. 21 shows a schematic cross-sectional view of an embodiment of a conductive heat roll joining apparatus.
Figure 22:
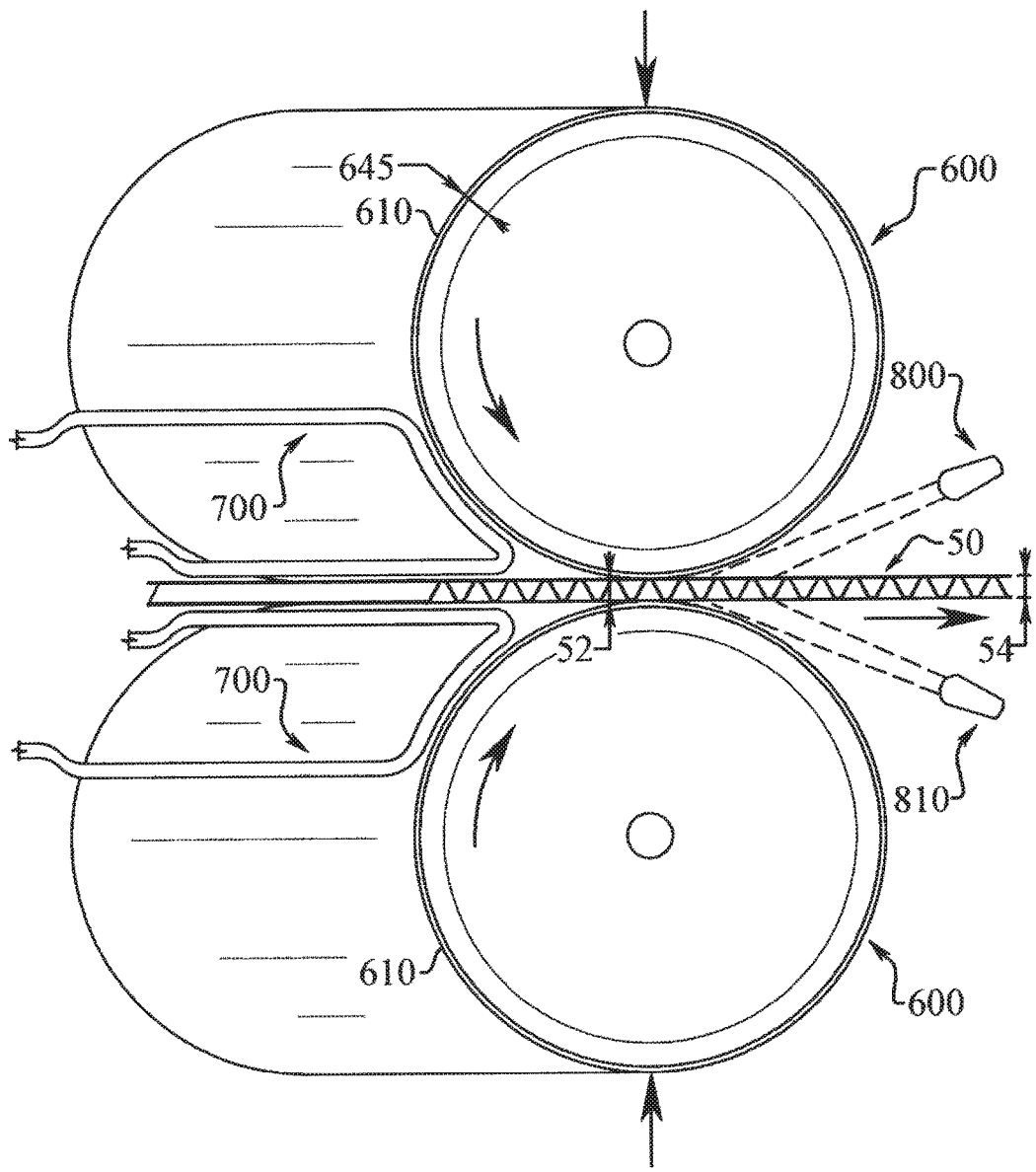
FIG. 22 shows a schematic isometric view of an embodiment of a resistive heat generation roller.
Figure 23:
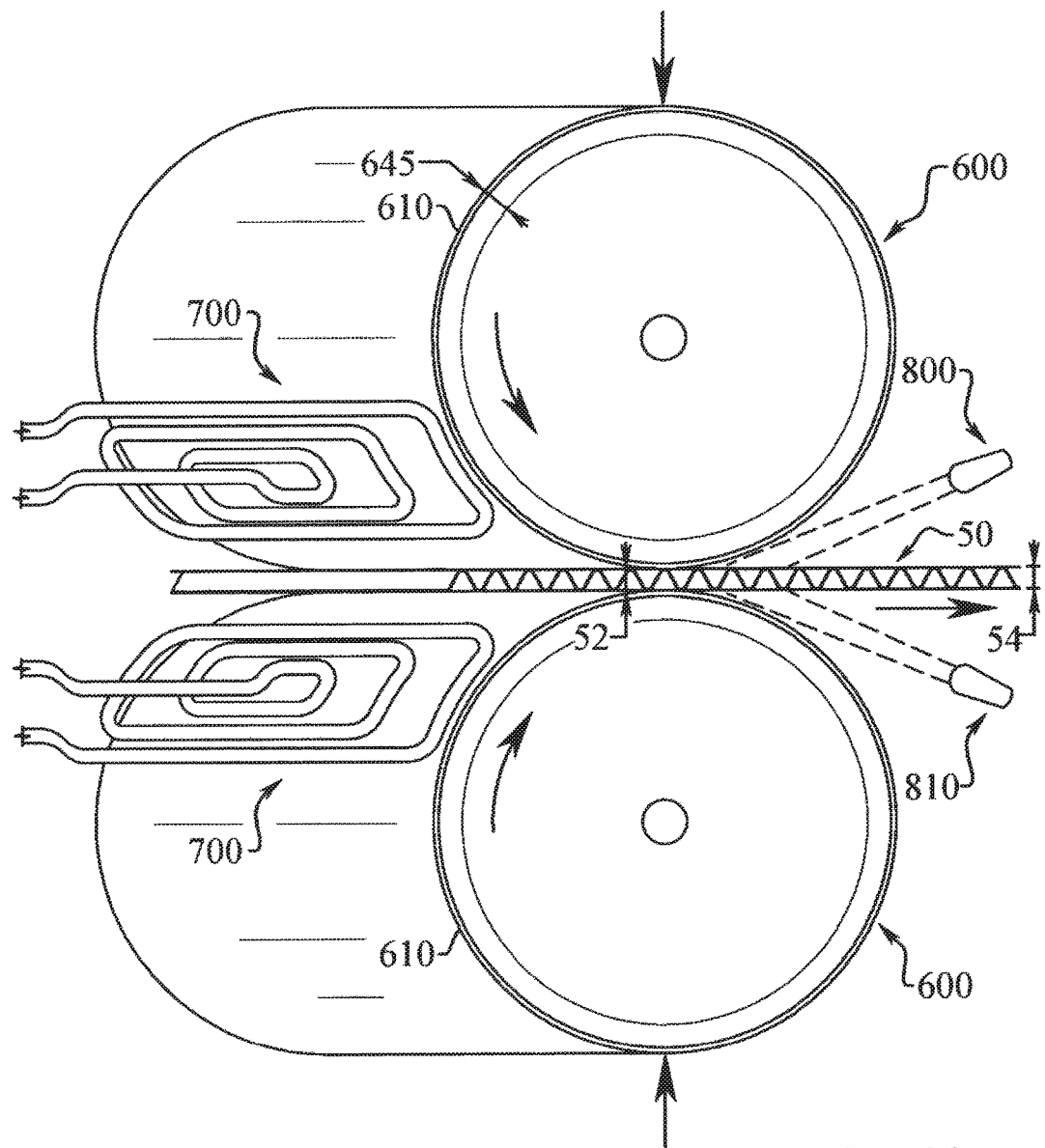
FIG. 23 shows a schematic isometric view of an embodiment of a resistive heat generation roller.
Figure 24:
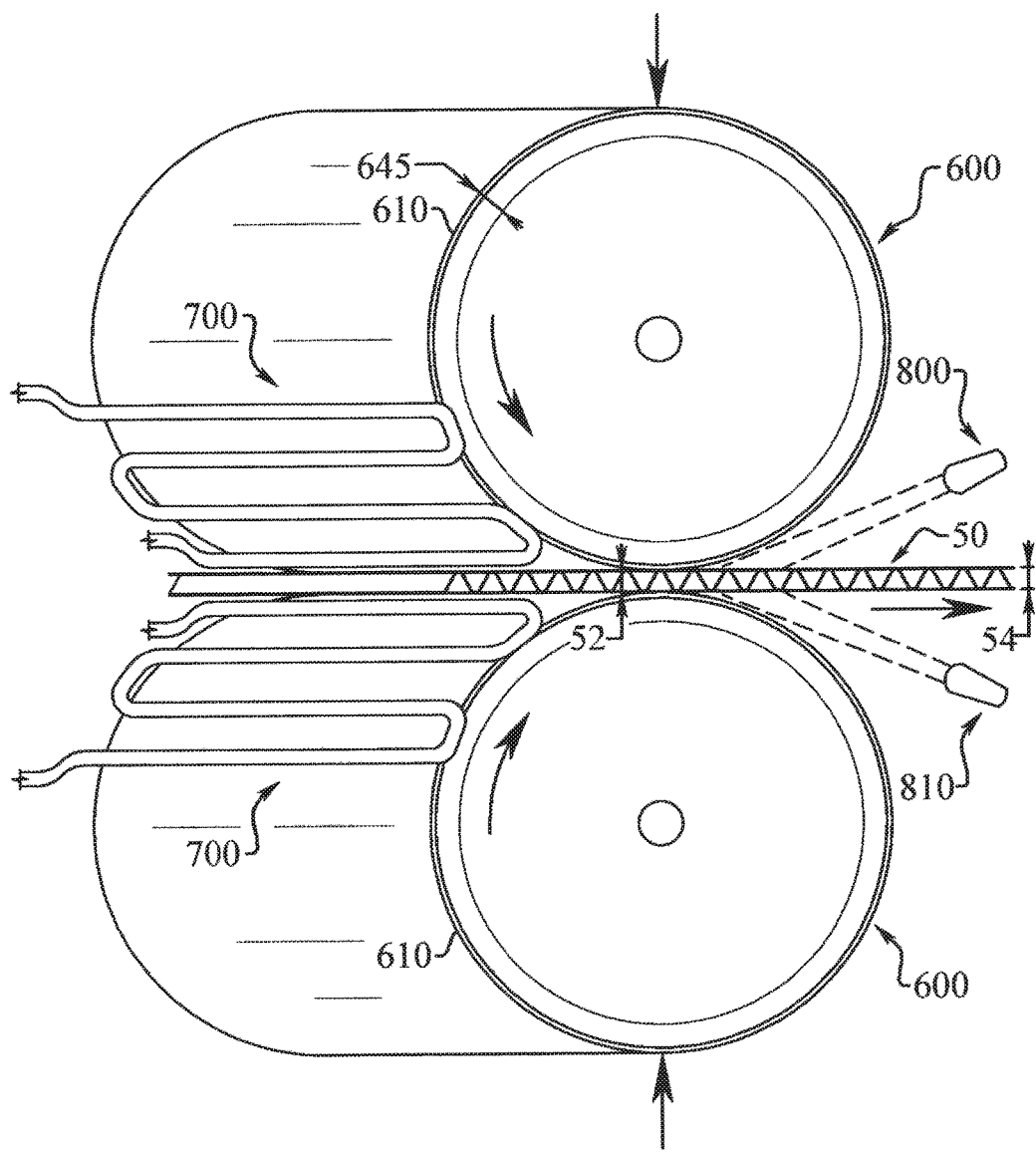
FIG. 24 shows a schematic isometric view of an embodiment of a resistive heat generation roller.

Lastly, referring again to the fact that the heating sources 500 may include, but are not limited to, a conduction heating source 600 and an induction heating source 700; an embodiment illustrating a schematic induction heating source 700 is shown in FIGS. 9 and 18-24. The induction heating source 700 may be configured to heat the workpieces, as seen in FIGS. 18 and 19, or alternatively may be configured to heat the resistive heat generation device 610, from the inside or outside, as seen in FIGS. 20-25. In one embodiment, at least one compression roller 710 keeps the workpieces in intimate contact during the solidification process. In this embodiment the induction heating source 700 serves as the transformer primary and conductive workpieces, or an electrically conductive portion of the resistive heat generation device 610, become a short circuit secondary. The conductive workpieces, or the electrically conductive portion of the resistive heat generation device 610, are exposed to the magnetic field generated by the induction heating source and eddy currents are induced within at least one of the workpieces, or a portion of the resistive heat generation device 610. The eddy currents flow against the electrical resistivity of the workpieces, or a portion of the resistive heat generation device 610, generating precise and localized heat without any direct contact with the induction heating source 700. The heated workpiece, or resistive heat generation device 610, then conductively heats a portion of the first workpiece distal coating layer 130 to a temperature above its melting point. All of the previous disclosure applies equally to the induction heating source 700 embodiment.

The induction heating source 700 includes an induction coil, which may be specially-shaped copper tubing through which alternating electrical current is passed, creating a varying magnetic field. One particular embodiment utilizes a two turn induction heating coil connected to a 12 kW power supply, which is able to finely control the temperature of the workpieces to ensure conductive heat transfer from the parent material layers quickly melts the first workpiece distal coating layer 130 and quickly allows solidification. In this embodiment the induction heating coil operates between 150 kHz to 200 kHz at 75-125 V and a current flow of 6-10 amps.

In another embodiment the induction heating source 700 is a curved induction coil designed to generally follow the curvature of the resistive heat generation roller 620, as seen in FIGS. 20-24. In fact, in these embodiments the induction coil may be designed to only heat a select portion of the resistive heat generation roller 620 immediately before it comes in contact with the workpiece. In fact, the preferred embodiments incorporate an induction heating source 700 carefully designed and positioned such that less than fifty percent of the circumference of the resistive heat generation roller 620 is heated to the processing temperature by the induction heating source 700, thereby reducing the power requirements and only heating a desired portion of the resistive heat generation roller 620. An even further embodiment takes this even further and ensures that less than thirty-three percent of the circumference of the resistive heat generation roller 620 is heated to the processing temperature by the induction heating source 700. In an event further embodiment, seen in FIG. 25, the induction heating source 700 is located inside the resistive heat generation roller 620. In this embodiment the induction heating source 700 remains stationary inside the roller 620 as the roller 620 rotates around the heating source, although the induction heating source 700 may rotate as well. Locating the induction heating source 700 within the roller 620 permits particularly desirable current induction within the roller 620. In the illustration of FIG. 25, the induction heating source 700 is arranged in a helical coil configuration; however, other configurations may be incorporated in this design.

Numerous alterations, modifications, and variations of the preferred embodiments disclosed herein will be apparent to those skilled in the art and they are all anticipated and contemplated to be within the spirit and scope of the present invention. For example, although specific embodiments have been described in detail, those with skill in the art will understand that the preceding embodiments and variations can be modified to incorporate various types of substitute and/or additional or alternative manufacturing processes and materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

The invention claimed is:
1. A method for creating a metallic structure, the method comprising:
   (a) contacting a first workpiece to spaced apart and substantially flat peaks of a second workpiece, each of the workpieces including a sheet metal parent layer and at least one zinc-coated layer;
   (b) heating a portion of a roller;
   (c) rotating the heated roller against the first workpiece;
   (d) brazing the zinc-coated layers of the workpieces together in response to step (c), without the use of a separate brazing alloy or flux;
   (e) maintaining at least some of the zinc-coated layers around a brazed connection between the workpieces to preserve corrosion resistance at the connection;
   (f) cooling another portion of the roller such that different areas of the roller are heated and cooled substantially simultaneously;
   (g) cooling the first workpiece with the cooled portion of the roller after the brazing;
   (h) the roller heating the first workpiece in less than seven seconds; and
   (i) the roller cooling the first workpiece in less than one second.
2. The method of claim 1, further comprising conducting electrical current through at least one section of the roller which is isolated from adjacent sections of the roller.

3. The method of claim 2, further comprising deterring electrical current from transmitting from the roller to the workpieces by use of an insulator surrounding the sections of the roller.

4. The method of claim 1, further comprising flowing cooling fluid through the roller.

5. The method of claim 1, wherein the roller heating step further comprises inductively heating the roller from an electrical coil positioned adjacent an exterior surface of the roller.

6. The method of claim 1, wherein the roller heating step further comprises internally heating the roller.

7. The method of claim 1, wherein the zinc-coated layers include a zinc and aluminum alloy with less than one-half percent aluminum.

8. The method of claim 1, wherein the zinc-coated layers include a zinc and aluminum alloy with four to six percent aluminum.

9. The method of claim 1, wherein the zinc-coated layers include a zinc and iron alloy with eight to eleven percent iron.

10. The method of claim 1, wherein the zinc-coated layers include a zinc and aluminum alloy with at least fifty percent aluminum and at least forty percent zinc.

11. The method of claim 1, wherein the zinc-coated layers include an alloy including four to twelve percent aluminum and two to five percent magnesium.

12. The method of claim 1, wherein the zinc-coated layers include four to twelve percent silicon.

13. The method of claim 1, wherein the zinc-coated layers include a zinc and lead alloy.

14. The method of claim 1, wherein the zinc-coated layers include two to sixteen percent tin.

15. A method for creating a metallic structure, the method comprising:
   (a) contacting a first workpiece to spaced apart and substantially flat peaks of a second workpiece, each of the workpieces including a sheet metal layer with a zinc-based coating;
   (b) heating a portion of a roller;
   (c) contacting the heated roller against the first workpiece;
   (d) brazing the zinc-based coating of the workpieces together, without the use of a separate brazing alloy or flux;
   (e) maintaining at least some of the zinc-coating around a brazed connection between the workpieces;
   (f) cooling another portion of the roller;
   (g) cooling the first workpiece with the cooled portion of the roller after the brazing;
   (h) conducting electrical current through at least one section of the roller which is isolated from adjacent sections of the roller; and
   (i) deterring electrical current from transmitting from the roller to the workpieces by use of an insulator surrounding the sections of the roller.

16. The method of claim 15, further comprising flowing cooling fluid through the roller.

17. The method of claim 15, wherein the roller heating step further comprises inductively heating the roller from an electrical coil positioned adjacent an exterior surface of the roller.

18. The method of claim 15, wherein the roller heating step further comprises internally heating the roller.

19. The method of claim 15, wherein the zinc-based coating includes a zinc and aluminum alloy with less than one-half percent aluminum.

20. The method of claim 15, wherein the zinc-based coating includes a zinc and aluminum alloy with four to six percent aluminum.

21. The method of claim 15, wherein the zinc-based coating includes a zinc and iron alloy with eight to eleven percent iron.

22. The method of claim 15, wherein the zinc-based coating includes a zinc and aluminum alloy with at least fifty percent aluminum and at least forty percent zinc.

23. The method of claim 15, wherein the zinc-based coating includes an alloy including four to twelve percent aluminum and two to five percent magnesium.

24. The method of claim 15, wherein the zinc-based coating includes four to twelve percent silicon.

25. The method of claim 15, wherein the zinc-based coating includes a zinc and lead alloy.

26. The method of claim 15, wherein the zinc-based coating includes two to sixteen percent tin.

27. The method of claim 15, further comprising:
   moving the workpieces through an adjacent pair of the rollers; and
   conducting heat outwardly through a peripheral area of at least one of the rollers by a radial conduction distance that is less than twenty-five percent of an outer diameter of the associated roller.

28. The method of claim 15, further comprising:
   moving the workpieces through an adjacent pair of the rollers; and
   directing resistive heat creating current to a portion of at least one of the rollers where a width of the portion is less than seventy-five percent of an outer diameter of the associated roller.

29. The method of claim 15, wherein the workpieces are each greater than one meter wide by two meters long, and the workpieces are part of a three metallic sheet sandwich with the second workpiece being a central core of the sandwich.

30. The method of claim 1, wherein:
   (a) the roller is a resistive heat roller having a roller contact surface including:
      (i) an electrical resistivity insulator externally located around the resistive heat roller adapted to be in physical contact with the first workpiece;
      (ii) an electrical resistivity of the electrical resistivity insulator being at least one hundred times greater than an electrical resistivity of a current carrying portion of the resistive heat roller; and
      (iii) a coefficient of thermal expansion of the current carrying portion of the resistive heat roller and a coefficient of thermal expansion of the electrical resistivity insulator differ by less than twenty percent;
   (b) the heating of the resistive heat roller is by electrical resistance heating, wherein the electrical resistivity insulator is adapted to prevent electrical current from passing from the resistive heat roller to the first workpiece; and
   (c) transferring the heat conductively through the electrical resistivity insulator to the workpiece for elevating a temperature of the roller contact surface to a setpoint temperature within a period of less than 5 seconds.

31. The method of claim 30, further comprising using an input contactor to establish electrical communication from an input conductor to a current carrying resistive heat roller section during rotation of the resistive heat roller, and using an output contactor to establish electrical communication from the current carrying resistive heat roller section to the output contactor during rotation of the resistive heat roller.

32. The method of claim 31, further comprising rotating the input contactor and the output contactor which are roller contacts.

33. The method of claim 31, further comprising sliding the input contactor and the output contactor which are sliding contacts.

34. The method of claim 1, wherein the heating is induction heating that induces electrical current within the roller which is a resistive heat roller and causes electrical resistance heating of the resistive heat roller.

35. The method of claim 34, wherein at least a portion of the induction heating is from a heater located inside of the resistive heat roller.

36. The method of claim 1, wherein the roller is a resistive heat roller further comprising a plurality of resistive heat roller sections arranged radially about the resistive heat roller and separated by a plurality of roller section gaps, wherein each of the resistive heat roller sections has a section width and a section thickness, the method further comprising:
   (a) contacting an electrical resistivity insulator with the plurality of resistive heat roller sections, and preventing physical contact among the plurality of resistive heat roller sections and the workpiece;
   (b) causing a coefficient of thermal expansion of the resistive heat roller sections and the coefficient of thermal expansion of the electrical resistivity insulator to differ by less than twenty percent; and
   (c) causing an input conductor and an output conductor to be in electrical communication with the current carrying portion of the resistive heat roller, and causing the input conductor and the output conductor to be in electrical communication with the resistive heat roller to control the passage of electrical current through no more than two of the plurality of resistive heat roller sections at a time.

37. The method of claim 1, further comprising causing the roller to achieve a contact surface setpoint temperature of at least 410 degrees Celsius.

38. The method of claim 37, further comprising cooling the workpiece after contacting the roller to a temperature of less than 400 degrees Celsius in less than 5 seconds.

39. A method for creating a metallic structure, the method comprising:
   (a) contacting outer workpiece sheets against opposite sides of a core workpiece sheet to create a sandwich, the outer workpiece sheets contacting against spaced apart and substantially flat peaks of the core workpiece sheet defined by alternating peaks and valleys thereof, each of the workpiece sheets including a metal layer and a zinc-coated layer;
   (b) compressing the sandwich between opposed rollers;
   (c) heating a first portion of each of the opposed rollers;
   (d) rotating the heated rollers against the outer workpiece sheets;
   (e) brazing the zinc-coated layers of the workpiece sheets together without the use of a separate brazing alloy or flux;
   (f) maintaining at least some of the zinc-coated layer adjacent a brazed connection between the workpiece sheets to preserve corrosion resistance at the connection;
   (g) cooling a second portion of at least one of the rollers;
   (h) cooling at least one of the outer workpiece sheets with the cooled portion of the at least one of the rollers after the brazing; and
   (i) the rollers heating the outer workplace sheets in less than seven seconds.

40. The method of claim 39, further comprising conducting electrical current through the first portion of at least one of the rollers, the first portion being isolated from adjacent sections of the at least one of the rollers.

41. The method of claim 39, further comprising flowing cooling fluid through at least one of the rollers.

42. The method of claim 39, wherein the roller heating step further comprises inductively heating at least one of the rollers from an electrical coil positioned adjacent an exterior surface of the at least one of the rollers.

43. The method of claim 39, wherein the roller heating step further comprises internally heating at least one of the rollers.

44. The method of claim 39, wherein the zinc-coated layer includes a zinc and aluminum alloy.

45. The method of claim 39, wherein the zinc-coated layer includes a zinc and iron alloy.

46. The method of claim 39, wherein the zinc-coated layer includes a zinc and magnesium alloy.

47. The method of claim 39, wherein the zinc-coated layer includes a zinc and lead alloy.

48. The method of claim 39, wherein for each of the heated rollers:
   (a) the roller is a resistive heat roller having a roller contact surface including:
      (i) an electrical resistivity insulator externally located around the resistive heat roller adapted to be in physical contact with an adjacent one of the outer workpiece sheets;
      (ii) an electrical resistivity of the electrical resistivity insulator being at least one hundred times greater than an electrical resistivity of a current carrying portion of the resistive heat roller; and
      (iii) a coefficient of thermal expansion of the current carrying portion of the resistive heat roller and a coefficient of thermal expansion of the electrical resistivity insulator differ by less than twenty percent;
   (b) the heating of the resistive heat roller is by electrical resistance heating, wherein the electrical resistivity insulator is adapted to prevent electrical current from passing from the resistive heat roller to the adjacent one of the workpiece sheets; and
   (c) transferring the heat conductively through the electrical resistivity insulator to the adjacent one of the workpiece sheets for elevating a temperature of the roller contact surface to a setpoint temperature within a period of less than 5 seconds.

49. The method of claim 39, wherein each of the heated rollers is a resistive heat roller further comprising a plurality of resistive heat roller sections arranged radially about the resistive heat roller and separated by a plurality of roller section gaps, wherein each of the resistive heat roller sections has a section width and a section thickness, the method further comprising:
   (a) contacting an electrical resistivity insulator with the plurality of resistive heat roller sections, and preventing physical contact among the plurality of resistive heat roller sections and an adjacent one of the workpiece sheets;
   (b) causing a coefficient of thermal expansion of the resistive heat roller sections and the coefficient of thermal expansion of the electrical resistivity insulator to differ by less than twenty percent; and (c) causing an input conductor and an output conductor to be in electrical communication with the current carrying portion of the resistive heat roller, and causing the input conductor and the output conductor to be in electrical communication with the resistive heat roller to control the passage of electrical current through no more than two of the plurality of resistive heat roller sections at a time.

* * * * *